US011023735B1

(12) United States Patent
Olshansky

(10) Patent No.: US 11,023,735 B1
(45) Date of Patent: Jun. 1, 2021

(54) AUTOMATIC VERSIONING OF VIDEO PRESENTATIONS

(71) Applicant: On Time Staffing Inc., Golden Valley, MN (US)

(72) Inventor: Roman Olshansky, Plymouth, MN (US)

(73) Assignee: On Time Staffing, Inc., Golden Valley, MN (US)

( * ) Notice: Subject to any disclaimer, the term of this patent is extended or adjusted under 35 U.S.C. 154(b) by 0 days.

(21) Appl. No.: 16/931,964

(22) Filed: Jul. 17, 2020

Related U.S. Application Data

(60) Provisional application No. 63/004,329, filed on Apr. 2, 2020.

(51) Int. Cl.
*G06K 9/00* (2006.01)
*G06Q 10/10* (2012.01)

(52) U.S. Cl.
CPC ..... *G06K 9/00718* (2013.01); *G06K 9/00744* (2013.01); *G06Q 10/1053* (2013.01)

(58) Field of Classification Search
CPC ........... G06K 9/00335; G06K 9/00302; G06K 9/00718; G06K 9/00744; G06Q 10/063112; G06Q 10/06398; G06Q 10/1053; G09B 5/14
USPC .......................................... 382/197; 705/321
See application file for complete search history.

(56) References Cited

U.S. PATENT DOCUMENTS

| | | |
|---|---|---|
| 1,173,785 A | 2/1916 | Deagan |
| 1,686,351 A | 10/1928 | Spitzglass |
| 3,152,622 A | 10/1964 | Rothermel |
| 3,764,135 A | 10/1973 | Madison |
| 5,109,281 A | 4/1992 | Kobori et al. |

(Continued)

FOREIGN PATENT DOCUMENTS

| | | |
|---|---|---|
| AU | 2002310201 | 3/2003 |
| CA | 2206105 | 12/2000 |

(Continued)

OTHER PUBLICATIONS

File History for U.S. Appl. No. 16/366,746 downloaded Aug. 21, 2020 (514 pages).

(Continued)

*Primary Examiner* — Daniel G Mariam
(74) *Attorney, Agent, or Firm* — Pauly, DeVries Smith & Deffner, LLC

(57) ABSTRACT

A system and method are presented to create custom versions for users of recorded sessions of individuals. Individuals are recorded at a booth responding to prompts. Audio and visual data recorded at the booth are divided into time segments according to the timing of the prompts. Depth sensors at the booth are used to assign score values to time segments. Prompts are related to criteria that were selected as being relevant to an objective. Users are associated with subsets of criteria in order to identify subsets of prompts whose responses are relevant to the users. Time segments of audio and visual data created by the identified subset of prompts are selected. The selected time segments are ordered according to herd behavior analysis. Lesser weighted time segments may be redacted. The remaining portions of ordered time segments are presented to the user as a custom version.

20 Claims, 17 Drawing Sheets

(56) References Cited

U.S. PATENT DOCUMENTS

| | | |
|---|---|---|
| 5,410,344 A | 4/1995 | Graves et al. |
| 5,867,209 A | 2/1999 | Irie et al. |
| 5,884,004 A | 3/1999 | Sato et al. |
| 5,886,967 A | 3/1999 | Aramaki |
| 5,897,220 A | 4/1999 | Huang et al. |
| 5,906,372 A | 5/1999 | Recard, Jr. |
| 5,937,138 A | 8/1999 | Fukuda et al. |
| 5,949,792 A | 9/1999 | Yasuda et al. |
| 6,128,414 A | 10/2000 | Liu |
| 6,229,904 B1 | 5/2001 | Huang et al. |
| 6,289,165 B1 | 9/2001 | Abecassis |
| 6,484,266 B2 | 11/2002 | Kashiwagi et al. |
| 6,502,199 B2 | 12/2002 | Kashiwagi et al. |
| 6,504,990 B1 | 1/2003 | Abecassis |
| RE37,994 E | 2/2003 | Fukuda et al. |
| 6,600,874 B1 | 7/2003 | Fujita et al. |
| 6,618,723 B1 | 9/2003 | Smith |
| 6,981,000 B2 | 12/2005 | Park et al. |
| 7,095,329 B2 | 8/2006 | Saubolle |
| 7,146,627 B1 | 12/2006 | Ismail et al. |
| 7,293,275 B1 | 11/2007 | Krieger et al. |
| 7,313,539 B1 | 12/2007 | Pappas et al. |
| 7,336,890 B2 | 2/2008 | Lu et al. |
| 7,499,918 B2 | 3/2009 | Ogikubo |
| 7,606,444 B1 | 10/2009 | Erol et al. |
| 7,702,542 B2 | 4/2010 | Aslanian, Jr. |
| 7,725,812 B1 | 5/2010 | Balkus et al. |
| 7,797,402 B2 | 9/2010 | Roos |
| 7,810,117 B2 | 10/2010 | Karnalkar et al. |
| 7,865,424 B2 | 1/2011 | Pappas et al. |
| 7,904,490 B2 | 3/2011 | Ogikubo |
| 7,962,375 B2 | 6/2011 | Pappas et al. |
| 7,974,443 B2 | 7/2011 | Kipman et al. |
| 7,991,635 B2 | 8/2011 | Hartmann |
| 7,996,292 B2 | 8/2011 | Pappas et al. |
| 8,032,447 B2 | 10/2011 | Pappas et al. |
| 8,046,814 B1 | 10/2011 | Badenell |
| 8,111,326 B1 | 2/2012 | Talwar |
| 8,169,548 B2 | 5/2012 | Ryckman |
| 8,185,543 B1 | 5/2012 | Choudhry et al. |
| 8,229,841 B2 | 7/2012 | Pappas et al. |
| 8,238,718 B2 | 8/2012 | Toyama et al. |
| 8,241,628 B2 | 8/2012 | Diefenbach-streiber et al. |
| 8,266,068 B1 | 9/2012 | Foss et al. |
| 8,300,785 B2 | 10/2012 | White |
| 8,301,550 B2 | 10/2012 | Pappas et al. |
| 8,301,790 B2 | 10/2012 | Morrison et al. |
| 8,326,133 B2 | 12/2012 | Lemmers |
| 8,326,853 B2 | 12/2012 | Richard et al. |
| 8,331,457 B2 | 12/2012 | Mizuno et al. |
| 8,331,760 B2 | 12/2012 | Butcher |
| 8,339,500 B2 | 12/2012 | Hattori et al. |
| 8,358,346 B2 | 1/2013 | Hikita et al. |
| 8,387,094 B1 | 2/2013 | Ho et al. |
| 8,505,054 B1 | 8/2013 | Kirley |
| 8,508,572 B2 | 8/2013 | Ryckman et al. |
| 8,543,450 B2 | 9/2013 | Pappas et al. |
| 8,560,482 B2 | 10/2013 | Miranda et al. |
| 8,566,880 B2 | 10/2013 | Dunker et al. |
| 8,600,211 B2 | 12/2013 | Nagano et al. |
| 8,611,422 B1 | 12/2013 | Yagnik et al. |
| 8,620,771 B2 | 12/2013 | Pappas et al. |
| 8,633,964 B1 | 1/2014 | Zhu |
| 8,650,114 B2 | 2/2014 | Pappas et al. |
| 8,751,231 B1 | 6/2014 | Larsen et al. |
| 8,774,604 B2 | 7/2014 | Torii et al. |
| 8,792,780 B2 | 7/2014 | Hattori |
| 8,824,863 B2 | 9/2014 | Kitamura et al. |
| 8,854,457 B2 | 10/2014 | De Vleeschouwer et al. |
| 8,856,000 B1 | 10/2014 | Larsen et al. |
| 8,902,282 B1 | 12/2014 | Zhu |
| 8,909,542 B2 | 12/2014 | Montero et al. |
| 8,913,103 B1 | 12/2014 | Sargin et al. |
| 8,918,532 B2 | 12/2014 | Lueth et al. |
| 8,930,260 B2 | 1/2015 | Pappas et al. |
| 8,988,528 B2 | 3/2015 | Hikita |
| 9,009,045 B1 | 4/2015 | Larsen et al. |
| 9,015,746 B2 | 4/2015 | Holmdahl et al. |
| 9,026,471 B2 | 5/2015 | Pappas et al. |
| 9,026,472 B2 | 5/2015 | Pappas et al. |
| 9,047,634 B2 | 6/2015 | Pappas et al. |
| 9,064,258 B2 | 6/2015 | Pappas et al. |
| 9,070,150 B2 | 6/2015 | Pappas et al. |
| 9,092,813 B2 | 7/2015 | Pappas et al. |
| 9,106,804 B2 | 8/2015 | Roberts et al. |
| 9,111,579 B2 | 8/2015 | Meaney et al. |
| 9,117,201 B2 | 8/2015 | Kennell et al. |
| 9,129,640 B2 | 9/2015 | Hamer |
| 9,135,674 B1 | 9/2015 | Yagnik et al. |
| 9,223,781 B2 | 12/2015 | Pearson et al. |
| 9,224,156 B2 | 12/2015 | Moorer |
| 9,305,286 B2 | 4/2016 | Larsen et al. |
| 9,305,287 B2 | 4/2016 | Krishnamoorthy et al. |
| 9,378,486 B2 | 6/2016 | Taylor et al. |
| 9,398,315 B2 | 7/2016 | Oks et al. |
| 9,402,050 B1 | 7/2016 | Recchia et al. |
| 9,437,247 B2 | 9/2016 | Pendergast et al. |
| 9,438,934 B1 | 9/2016 | Zhu |
| 9,443,556 B2 | 9/2016 | Cordell et al. |
| 9,456,174 B2 | 9/2016 | Boyle et al. |
| 9,462,301 B2 | 10/2016 | Paśko |
| 9,501,663 B1 | 11/2016 | Hopkins et al. |
| 9,501,944 B2 | 11/2016 | Boneta et al. |
| 9,542,452 B1 | 1/2017 | Ross et al. |
| 9,544,380 B2 | 1/2017 | Deng et al. |
| 9,554,160 B2 | 1/2017 | Han et al. |
| 9,570,107 B2 | 2/2017 | Boiman et al. |
| 9,583,144 B2 | 2/2017 | Ricciardi |
| 9,600,723 B1 | 3/2017 | Pantofaru et al. |
| 9,607,655 B2 | 3/2017 | Bloch et al. |
| 9,652,745 B2 | 5/2017 | Taylor et al. |
| 9,653,115 B2 | 5/2017 | Bloch et al. |
| 9,666,194 B2 | 5/2017 | Ondeck et al. |
| 9,684,435 B2 | 6/2017 | Carr et al. |
| 9,693,019 B1 | 6/2017 | Fluhr et al. |
| 9,710,790 B2 | 7/2017 | Taylor et al. |
| 9,723,223 B1 | 8/2017 | Banta et al. |
| 9,747,573 B2 | 8/2017 | Shaburov et al. |
| 9,792,955 B2 | 10/2017 | Fleischhauer et al. |
| 9,805,767 B1 | 10/2017 | Strickland |
| 9,823,809 B2 | 11/2017 | Roos |
| 9,876,963 B2 | 1/2018 | Nakamura et al. |
| 9,881,647 B2 | 1/2018 | Mccauley et al. |
| 9,936,185 B2 | 4/2018 | Delvaux et al. |
| 9,940,508 B2 | 4/2018 | Kaps et al. |
| 9,940,973 B2 | 4/2018 | Roberts et al. |
| 9,979,921 B2 | 5/2018 | Holmes |
| 10,008,239 B2 | 6/2018 | Eris |
| 10,019,653 B2 | 7/2018 | Wilf et al. |
| 10,021,377 B2 | 7/2018 | Newton et al. |
| 10,108,932 B2 | 10/2018 | Sung et al. |
| 10,115,038 B2 | 10/2018 | Hazur et al. |
| 10,147,460 B2 | 12/2018 | Ullrich |
| 10,152,695 B1 | 12/2018 | Chiu et al. |
| 10,152,696 B2 | 12/2018 | Thankappan et al. |
| 10,168,866 B2 | 1/2019 | Wakeen et al. |
| 10,178,427 B2 | 1/2019 | Huang |
| 10,235,008 B2 | 3/2019 | Lee et al. |
| 10,242,345 B2 | 3/2019 | Taylor et al. |
| 10,268,736 B1 | 4/2019 | Balasia et al. |
| 10,296,873 B1 | 5/2019 | Balasia et al. |
| 10,310,361 B1 | 6/2019 | Featherstone |
| 10,318,927 B2 | 6/2019 | Champaneria |
| 10,325,243 B1 | 6/2019 | Ross et al. |
| 10,346,805 B2 | 7/2019 | Taylor et al. |
| 10,346,928 B2 | 7/2019 | Li et al. |
| 10,353,720 B2 | 7/2019 | Wich-vila |
| 10,438,135 B2 | 10/2019 | Larsen et al. |
| 10,694,097 B1 | 6/2020 | Shirakyan |
| 10,728,443 B1 | 7/2020 | Olshansky |
| 10,735,396 B2 | 8/2020 | Krstic et al. |
| 10,963,841 B2 | 3/2021 | Olshansky |
| 2001/0001160 A1 | 5/2001 | Shoff et al. |
| 2001/0038746 A1 | 11/2001 | Hughes et al. |

(56) References Cited

U.S. PATENT DOCUMENTS

| | | |
|---|---|---|
| 2002/0097984 A1 | 7/2002 | Abecassis |
| 2002/0113879 A1 | 8/2002 | Battle et al. |
| 2002/0122659 A1 | 9/2002 | Mcgrath et al. |
| 2002/0191071 A1 | 12/2002 | Rui et al. |
| 2003/0005429 A1 | 1/2003 | Colsey |
| 2003/0027611 A1 | 2/2003 | Recard |
| 2003/0189589 A1 | 10/2003 | Leblanc et al. |
| 2003/0194211 A1 | 10/2003 | Abecassis |
| 2004/0033061 A1 | 2/2004 | Hughes et al. |
| 2004/0186743 A1 | 9/2004 | Cordero |
| 2004/0264919 A1 | 12/2004 | Taylor et al. |
| 2005/0095569 A1 | 5/2005 | Franklin |
| 2005/0137896 A1 | 6/2005 | Pentecost et al. |
| 2005/0187765 A1 | 8/2005 | Kim et al. |
| 2005/0232462 A1 | 10/2005 | Vallone et al. |
| 2005/0235033 A1 | 10/2005 | Doherty |
| 2005/0271251 A1 | 12/2005 | Russell et al. |
| 2006/0042483 A1 | 3/2006 | Work et al. |
| 2006/0045179 A1 | 3/2006 | Mizuno et al. |
| 2006/0100919 A1 | 5/2006 | Levine |
| 2006/0116555 A1 | 6/2006 | Pavlidis et al. |
| 2006/0229896 A1 | 10/2006 | Rosen et al. |
| 2007/0088601 A1 | 4/2007 | Money et al. |
| 2007/0124161 A1 | 5/2007 | Mueller et al. |
| 2007/0237502 A1 | 10/2007 | Ryckman et al. |
| 2007/0288245 A1 | 12/2007 | Benjamin |
| 2008/0086504 A1 | 4/2008 | Sanders et al. |
| 2009/0083103 A1 | 3/2009 | Basser |
| 2009/0083670 A1 | 3/2009 | Roos |
| 2009/0087161 A1 | 4/2009 | Roberts et al. |
| 2009/0144785 A1 | 6/2009 | Walker et al. |
| 2009/0171899 A1 | 7/2009 | Chittoor et al. |
| 2009/0248685 A1 | 10/2009 | Pasqualoni et al. |
| 2009/0258334 A1 | 10/2009 | Pyne |
| 2010/0086283 A1 | 4/2010 | Ramachandran et al. |
| 2010/0183280 A1 | 7/2010 | Beauregard et al. |
| 2010/0191561 A1 | 7/2010 | Jeng et al. |
| 2010/0199228 A1 | 8/2010 | Latta et al. |
| 2010/0223109 A1 | 9/2010 | Hawn et al. |
| 2010/0325307 A1 | 12/2010 | Roos |
| 2011/0055098 A1 | 3/2011 | Stewart |
| 2011/0055930 A1 | 3/2011 | Flake et al. |
| 2011/0060671 A1 | 3/2011 | Erbey et al. |
| 2011/0076656 A1 | 3/2011 | Scott et al. |
| 2011/0088081 A1 | 4/2011 | Folkesson et al. |
| 2011/0135279 A1 | 6/2011 | Leonard |
| 2012/0036127 A1 | 2/2012 | Work et al. |
| 2012/0053996 A1 | 3/2012 | Galbavy |
| 2012/0084649 A1 | 4/2012 | Dowdell et al. |
| 2012/0114246 A1 | 5/2012 | Weitzman |
| 2012/0130771 A1 | 5/2012 | Kannan et al. |
| 2012/0257875 A1 | 10/2012 | Sharpe et al. |
| 2012/0271774 A1 | 10/2012 | Clegg |
| 2013/0007670 A1 | 1/2013 | Roos |
| 2013/0016815 A1 | 1/2013 | Odinak et al. |
| 2013/0016816 A1 | 1/2013 | Odinak et al. |
| 2013/0016823 A1 | 1/2013 | Odinak et al. |
| 2013/0024105 A1 | 1/2013 | Thomas |
| 2013/0111401 A1 | 5/2013 | Newman et al. |
| 2013/0121668 A1 | 5/2013 | Meaney et al. |
| 2013/0124998 A1 | 5/2013 | Pendergast et al. |
| 2013/0124999 A1 | 5/2013 | Agnoli et al. |
| 2013/0125000 A1 | 5/2013 | Fleischhauer et al. |
| 2013/0177296 A1 | 7/2013 | Geisner et al. |
| 2013/0212033 A1 | 8/2013 | Work et al. |
| 2013/0212180 A1 | 8/2013 | Work et al. |
| 2013/0216206 A1 | 8/2013 | Dubin et al. |
| 2013/0218688 A1 | 8/2013 | Roos |
| 2013/0222601 A1 | 8/2013 | Engstroem et al. |
| 2013/0226578 A1 | 8/2013 | Bolton et al. |
| 2013/0226674 A1 | 8/2013 | Field et al. |
| 2013/0226910 A1 | 8/2013 | Work et al. |
| 2013/0254192 A1 | 9/2013 | Work et al. |
| 2013/0259447 A1 | 10/2013 | Sathish et al. |
| 2013/0266925 A1 | 10/2013 | Nunamaker, Jr. et al. |
| 2013/0268452 A1 | 10/2013 | Macewen et al. |
| 2013/0283378 A1 | 10/2013 | Costigan et al. |
| 2013/0290210 A1 | 10/2013 | Cline et al. |
| 2013/0290325 A1 | 10/2013 | Work et al. |
| 2013/0290420 A1 | 10/2013 | Work et al. |
| 2013/0290448 A1 | 10/2013 | Work et al. |
| 2013/0297589 A1 | 11/2013 | Work et al. |
| 2013/0332381 A1* | 12/2013 | Clark ............... G06Q 10/1053 705/321 |
| 2013/0332382 A1 | 12/2013 | Lapasta et al. |
| 2014/0089217 A1 | 3/2014 | McGovern et al. |
| 2014/0092254 A1 | 4/2014 | Mughal et al. |
| 2014/0123177 A1 | 5/2014 | Kim et al. |
| 2014/0125703 A1 | 5/2014 | Roveta et al. |
| 2014/0143165 A1 | 5/2014 | Posse et al. |
| 2014/0153902 A1 | 6/2014 | Pearson et al. |
| 2014/0186004 A1 | 7/2014 | Hamer |
| 2014/0191939 A1 | 7/2014 | Penn et al. |
| 2014/0192200 A1 | 7/2014 | Zagron |
| 2014/0198196 A1 | 7/2014 | Howard et al. |
| 2014/0214709 A1 | 7/2014 | Greaney |
| 2014/0245146 A1 | 8/2014 | Roos |
| 2014/0258288 A1 | 9/2014 | Work et al. |
| 2014/0270706 A1 | 9/2014 | Pasko |
| 2014/0278506 A1 | 9/2014 | Rogers et al. |
| 2014/0278683 A1 | 9/2014 | Kennell et al. |
| 2014/0279634 A1 | 9/2014 | Seeker |
| 2014/0282709 A1 | 9/2014 | Hardy et al. |
| 2014/0317009 A1 | 10/2014 | Bilodeau et al. |
| 2014/0317126 A1 | 10/2014 | Work et al. |
| 2014/0325359 A1 | 10/2014 | Vehovsky et al. |
| 2014/0325373 A1 | 10/2014 | Kramer et al. |
| 2014/0327779 A1 | 11/2014 | Eronen et al. |
| 2014/0330734 A1 | 11/2014 | Sung et al. |
| 2014/0336942 A1 | 11/2014 | Pe'er et al. |
| 2014/0337900 A1 | 11/2014 | Hurley |
| 2014/0356822 A1 | 12/2014 | Hoque et al. |
| 2014/0359439 A1 | 12/2014 | Lyren |
| 2015/0003603 A1 | 1/2015 | Odinak et al. |
| 2015/0003605 A1 | 1/2015 | Odinak et al. |
| 2015/0006422 A1 | 1/2015 | Carter et al. |
| 2015/0012453 A1 | 1/2015 | Odinak et al. |
| 2015/0046357 A1 | 2/2015 | Danson et al. |
| 2015/0063775 A1 | 3/2015 | Nakamura et al. |
| 2015/0067723 A1 | 3/2015 | Bloch et al. |
| 2015/0099255 A1 | 4/2015 | Aslan et al. |
| 2015/0100702 A1 | 4/2015 | Krishna et al. |
| 2015/0127565 A1 | 5/2015 | Chevalier et al. |
| 2015/0139601 A1 | 5/2015 | Mate et al. |
| 2015/0154564 A1 | 6/2015 | Moon et al. |
| 2015/0155001 A1 | 6/2015 | Kikugawa et al. |
| 2015/0170303 A1 | 6/2015 | Geritz et al. |
| 2015/0201134 A1 | 7/2015 | Carr et al. |
| 2015/0205800 A1 | 7/2015 | Work et al. |
| 2015/0205872 A1 | 7/2015 | Work et al. |
| 2015/0206102 A1 | 7/2015 | Cama et al. |
| 2015/0222815 A1 | 8/2015 | Wang et al. |
| 2015/0228306 A1 | 8/2015 | Roberts et al. |
| 2015/0242707 A1 | 8/2015 | Wilf et al. |
| 2015/0269165 A1 | 9/2015 | Work et al. |
| 2015/0269529 A1 | 9/2015 | Kyllonen et al. |
| 2015/0269530 A1 | 9/2015 | Work et al. |
| 2015/0271289 A1 | 9/2015 | Work et al. |
| 2015/0278223 A1 | 10/2015 | Work et al. |
| 2015/0278290 A1 | 10/2015 | Work et al. |
| 2015/0278964 A1 | 10/2015 | Work et al. |
| 2015/0324698 A1 | 11/2015 | Karaoguz et al. |
| 2015/0339939 A1 | 11/2015 | Gustafson et al. |
| 2015/0356512 A1 | 12/2015 | Bradley |
| 2015/0380052 A1 | 12/2015 | Hamer |
| 2016/0005029 A1 | 1/2016 | Ivey et al. |
| 2016/0036976 A1 | 2/2016 | Odinak et al. |
| 2016/0104096 A1 | 4/2016 | Ovick et al. |
| 2016/0116827 A1 | 4/2016 | Tarres Bolos |
| 2016/0117942 A1 | 4/2016 | Marino et al. |
| 2016/0154883 A1 | 6/2016 | Boerner |
| 2016/0155475 A1 | 6/2016 | Hamer |
| 2016/0180234 A1 | 6/2016 | Siebach et al. |
| 2016/0180883 A1 | 6/2016 | Hamer |

(56) References Cited

U.S. PATENT DOCUMENTS

| | | |
|---|---|---|
| 2016/0219264 A1 | 7/2016 | Delvaux et al. |
| 2016/0225409 A1 | 8/2016 | Eris |
| 2016/0225410 A1 | 8/2016 | Lee et al. |
| 2016/0247537 A1 | 8/2016 | Ricciardi |
| 2016/0267436 A1 | 9/2016 | Silber et al. |
| 2016/0313892 A1 | 10/2016 | Roos |
| 2016/0323608 A1 | 11/2016 | Bloch et al. |
| 2016/0330398 A1 | 11/2016 | Recchia et al. |
| 2017/0026667 A1 | 1/2017 | Pasko |
| 2017/0039525 A1 | 2/2017 | Seidle et al. |
| 2017/0076751 A9 | 3/2017 | Hamer |
| 2017/0134776 A1 | 5/2017 | Ranjeet et al. |
| 2017/0164013 A1 | 6/2017 | Abramov et al. |
| 2017/0164014 A1 | 6/2017 | Abramov et al. |
| 2017/0164015 A1 | 6/2017 | Abramov et al. |
| 2017/0171602 A1 | 6/2017 | Qu |
| 2017/0178688 A1 | 6/2017 | Ricciardi |
| 2017/0195491 A1 | 7/2017 | Odinak et al. |
| 2017/0206504 A1 | 7/2017 | Taylor et al. |
| 2017/0213190 A1 | 7/2017 | Hazan |
| 2017/0213573 A1 | 7/2017 | Takeshita et al. |
| 2017/0227353 A1 | 8/2017 | Brunner |
| 2017/0236073 A1 | 8/2017 | Borisyuk et al. |
| 2017/0244894 A1 | 8/2017 | Aggarwal et al. |
| 2017/0244984 A1 | 8/2017 | Aggarwal et al. |
| 2017/0244991 A1 | 8/2017 | Aggarwal et al. |
| 2017/0262706 A1 | 9/2017 | Sun et al. |
| 2017/0264958 A1 | 9/2017 | Hutten |
| 2017/0293413 A1 | 10/2017 | Matsushita et al. |
| 2017/0316806 A1 | 11/2017 | Warren et al. |
| 2017/0332044 A1 | 11/2017 | Marlow et al. |
| 2017/0353769 A1 | 12/2017 | Husain et al. |
| 2017/0372748 A1 | 12/2017 | Mccauley et al. |
| 2018/0011621 A1 | 1/2018 | Roos |
| 2018/0025303 A1 | 1/2018 | Janz |
| 2018/0054641 A1 | 2/2018 | Hall et al. |
| 2018/0070045 A1 | 3/2018 | Holmes |
| 2018/0074681 A1 | 3/2018 | Roos |
| 2018/0082238 A1 | 3/2018 | Shani |
| 2018/0096307 A1 | 4/2018 | Fortier et al. |
| 2018/0109737 A1 | 4/2018 | Nakamura et al. |
| 2018/0109826 A1 | 4/2018 | Mccoy et al. |
| 2018/0110460 A1 | 4/2018 | Danson et al. |
| 2018/0114154 A1 | 4/2018 | Bae |
| 2018/0130497 A1 | 5/2018 | Mccauley et al. |
| 2018/0132014 A1 | 5/2018 | Khazanov et al. |
| 2018/0150604 A1 | 5/2018 | Arena et al. |
| 2018/0158027 A1 | 6/2018 | Venigalla |
| 2018/0182436 A1 | 6/2018 | Ullrich |
| 2018/0191955 A1 | 7/2018 | Aoki et al. |
| 2018/0218238 A1 | 8/2018 | Viirre et al. |
| 2018/0226102 A1 | 8/2018 | Roberts et al. |
| 2018/0227501 A1 | 8/2018 | King |
| 2018/0253697 A1 | 9/2018 | Sung et al. |
| 2018/0268868 A1 | 9/2018 | Salokannel et al. |
| 2018/0270613 A1 | 9/2018 | Park |
| 2018/0302680 A1 | 10/2018 | Cormican |
| 2018/0308521 A1 | 10/2018 | Iwamoto |
| 2018/0316947 A1 | 11/2018 | Todd |
| 2018/0336930 A1 | 11/2018 | Takahashi |
| 2018/0350405 A1 | 12/2018 | Marco et al. |
| 2018/0374251 A1 | 12/2018 | Mitchell et al. |
| 2018/0376225 A1 | 12/2018 | Jones et al. |
| 2019/0005373 A1 | 1/2019 | Nims et al. |
| 2019/0057356 A1 | 2/2019 | Larsen et al. |
| 2019/0087558 A1 | 3/2019 | Mercury et al. |
| 2019/0096307 A1 | 3/2019 | Liang et al. |
| 2019/0141033 A1 | 5/2019 | Kaafar et al. |
| 2019/0244176 A1 | 8/2019 | Chuang et al. |
| 2019/0259002 A1 | 8/2019 | Balasia et al. |
| 2019/0295040 A1 | 9/2019 | Clines |
| 2019/0311488 A1 | 10/2019 | Sareen |
| 2019/0325064 A1 | 10/2019 | Mathiesen et al. |
| 2020/0012350 A1 | 1/2020 | Tay |
| 2020/0110786 A1 | 4/2020 | Kim |
| 2020/0126545 A1 | 4/2020 | Kakkar et al. |
| 2020/0143329 A1 | 5/2020 | Gamaliel |
| 2020/0311163 A1 | 10/2020 | Ma et al. |
| 2020/0311682 A1 | 10/2020 | Olshansky |
| 2020/0311953 A1 | 10/2020 | Olshansky |
| 2020/0396376 A1 | 12/2020 | Olshansky |
| 2021/0035047 A1 | 2/2021 | Mossoba et al. |

FOREIGN PATENT DOCUMENTS

| | | |
|---|---|---|
| CA | 2763634 | 12/2012 |
| CN | 109146430 | 1/2019 |
| EP | 1376584 | 1/2004 |
| EP | 1566748 | 8/2005 |
| EP | 1775949 | 12/2007 |
| EP | 1954041 | 8/2008 |
| JP | 2009258175 | 11/2009 |
| JP | 2019016192 | 1/2019 |
| WO | 9703366 | 1/1997 |
| WO | 9713366 | 4/1997 |
| WO | 9713367 | 4/1997 |
| WO | 9828908 | 7/1998 |
| WO | 9841978 | 9/1998 |
| WO | 9905865 | 2/1999 |
| WO | 0133421 | 5/2001 |
| WO | 0117250 | 9/2002 |
| WO | 03003725 | 1/2003 |
| WO | 2004062563 | 7/2004 |
| WO | 2005114377 | 12/2005 |
| WO | 2006103578 | 10/2006 |
| WO | 2006129496 | 12/2006 |
| WO | 2007039994 | 4/2007 |
| WO | 2007097218 | 8/2007 |
| WO | 2008029803 | 3/2008 |
| WO | 2008039407 | 4/2008 |
| WO | 2009042858 | 4/2009 |
| WO | 2009042900 | 4/2009 |
| WO | 2009075190 | 6/2009 |
| WO | 2009116955 | 9/2009 |
| WO | 2009157446 | 12/2009 |
| WO | 2010055624 | 5/2010 |
| WO | 2010116998 | 10/2010 |
| WO | 2011001180 | 1/2011 |
| WO | 2011007011 | 1/2011 |
| WO | 2011035419 | 3/2011 |
| WO | 2011129578 | 10/2011 |
| WO | 2011136571 | 11/2011 |
| WO | 2012002896 | 1/2012 |
| WO | 2012068433 | 5/2012 |
| WO | 2012039959 | 6/2012 |
| WO | 2012089855 | 7/2012 |
| WO | 2013026095 | 2/2013 |
| WO | 2013039351 | 3/2013 |
| WO | 2013074207 | 5/2013 |
| WO | 2013088208 | 6/2013 |
| WO | 2013093176 | 6/2013 |
| WO | 2013131134 | 9/2013 |
| WO | 2014089362 | 6/2014 |
| WO | 2014093668 | 6/2014 |
| WO | 2014152021 | 9/2014 |
| WO | 2014163283 | 10/2014 |
| WO | 2014164549 | 10/2014 |
| WO | 2015031946 | 4/2015 |
| WO | 2015071490 | 5/2015 |
| WO | 2015109290 | 7/2015 |
| WO | 2016031431 | 3/2016 |
| WO | 2016053522 | 4/2016 |
| WO | 2016123057 | 4/2016 |
| WO | 2016073206 | 5/2016 |
| WO | 2016138121 | 9/2016 |
| WO | 2016138161 | 9/2016 |
| WO | 2016186798 | 11/2016 |
| WO | 2016189348 | 12/2016 |
| WO | 2017022641 | 2/2017 |
| WO | 2017042831 | 3/2017 |
| WO | 2017049612 | 3/2017 |
| WO | 2017051063 | 3/2017 |
| WO | 2017096271 | 6/2017 |
| WO | 2017130810 | 8/2017 |

(56) References Cited

FOREIGN PATENT DOCUMENTS

| | | |
|---|---|---|
| WO | 2017150772 | 9/2017 |
| WO | 2017192125 | 11/2017 |
| WO | 2018042175 | 3/2018 |
| WO | 2018094443 | 5/2018 |
| WO | 2020198230 | 10/2020 |
| WO | 2020198240 | 10/2020 |
| WO | 2020198363 | 10/2020 |

OTHER PUBLICATIONS

File History for U.S. Appl. No. 16/366,703 downloaded Aug. 21, 2020 (668 pages).
File History for U.S. Appl. No. 16/696,781 downloaded Aug. 21, 2020 (213 pages).
"International Search Report and Written Opinion," for PCT Application No. PCT/US2020/024470 dated Jul. 9, 2020 (13 pages).
"International Search Report and Written Opinion," for PCT Application No. PCT/US2020/024488 dated May 19, 2020 (14 pages).
"International Search Report and Written Opinion," for PCT Application No. PCT/US2020/024722 dated Jul. 10, 2020 (13 pages).
"Final Office Action," for U.S. Appl. No. 16/696,781 dated Oct. 8, 2020 (26 pages).
"Non-Final Office Action," for U.S. Appl. No. 16/828,578 dated Sep. 24, 2020 (39 pages).
"Notice of Allowance," for U.S. Appl. No. 16/366,703 dated Nov. 18, 2020 (19 pages).
Ramanarayanan, Vikram et al., "Evaluating Speech, Face, Emotion and Body Movement Time-series Features for Automated Multimodal Presentation Scoring," In Proceedings of the 2015 ACM on (ICMI 2015). Association for Computing Machinery, New York, NY, USA, 23-30 (8 pages).
"Response to Final Office Action," for U.S. Appl. No. 16/696,781, filed Dec. 8, 2020 (18 pages).
"Response to Non Final Office Action," for U.S. Appl. No. 16/828,578, filed Dec. 22, 2020 (17 pages).
"Response to Non-Final Rejection," dated May 6, 2020 for U.S. Appl. No. 16/366,703, submitted via EFS-Web on Sep. 8, 2020, 25 pages.
Advantage Video Systems, "Jeffrey Stansfield of AVS interviews rep about Air-Hush products at the 2019 NAMM Expo," YouTube video, available at https://www.youtube.com/watch?v=nWzrM99gk_o, accessed Jan. 17, 2021.
"Final Office Action," for U.S. Appl. No. 16/828,578 dated Jan. 14, 2021 (27 pages).
"Invitation to Pay Additional Fees," for PCT Application No. PCT/US2020/062246 dated Feb. 11, 2021 (14 pages).
"Non-Final Office Action," for U.S. Appl. No. 16/696,781 dated Jan. 26, 2021 (28 pages).
"Non-Final Office Action," for U.S. Appl. No. 17/025,902 dated Jan. 29, 2021 (59 pages).
"Response to Advisory Action," for U.S. Appl. No. 16/696,781, dated Jan. 8, 2021 (22 pages).
"Air Canada Keeping Your Points Active Aeroplan," https://www.aircanada.com/us/en/aco/home/aeroplan/your-aeroplan/inactivity-policy.html, 6 pages.
"American Express Frequently Asked Question: Why were Membership Rewards points forfeited and how can I reinstate them?," https://www.americanexpress.com/us/customer-service/faq.membership-rewards-points-forfeiture.html, 2 pages.
Brocardo, Marcelo L. et al., "Verifying Online User Identity using Stylometric Analysis for Short Messages," Journal of Networks, vol. 9, No. 12, Dec. 2014, pp. 3347-3355.
"International Search Report and Written Opinion," for PCT Application No. PCT/US2020/062246 dated Apr. 1, 2021 (18 pages).
"Response to Non Final Office Action," for U.S. Appl. 16/696,781, dated Apr. 23, 2021 (16 pages).
"Response to Non Final Office Action," for U.S. Appl. 17/025,902, dated Apr. 28, 2021 (16 pages).

* cited by examiner

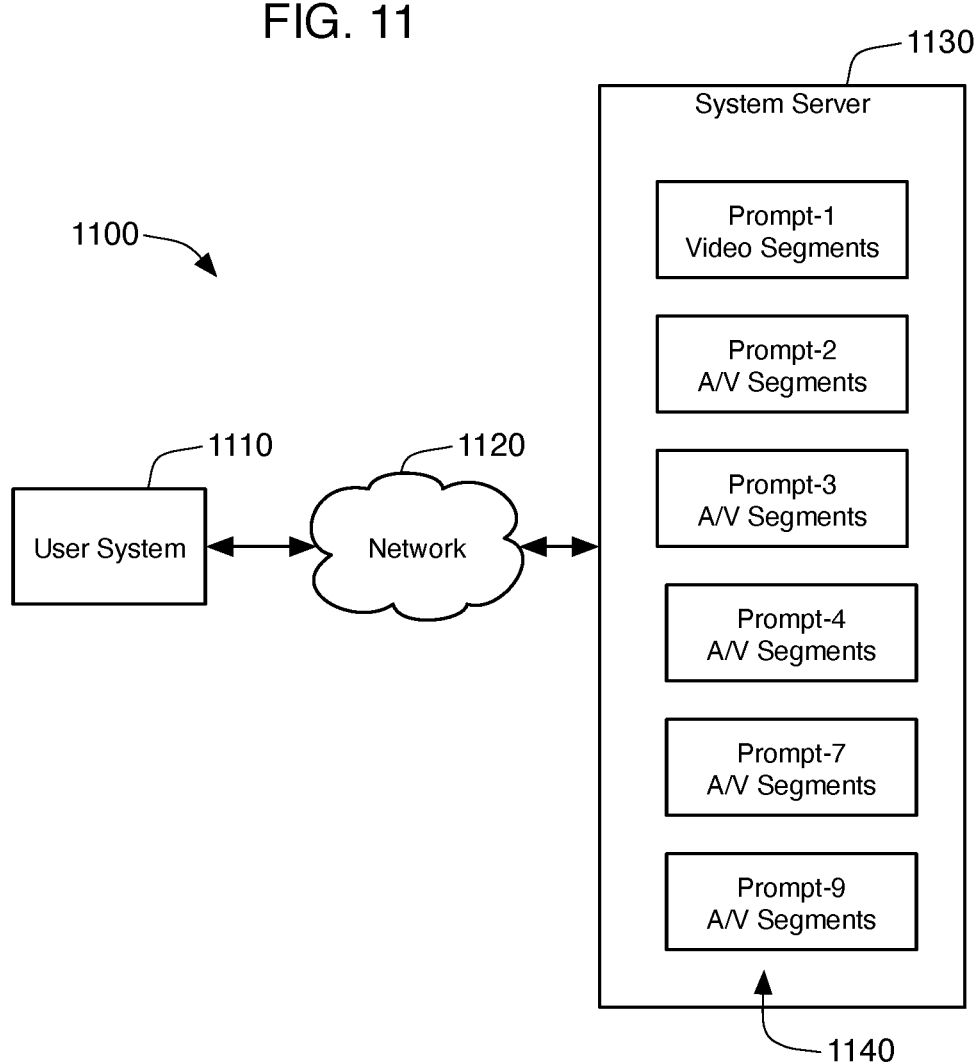

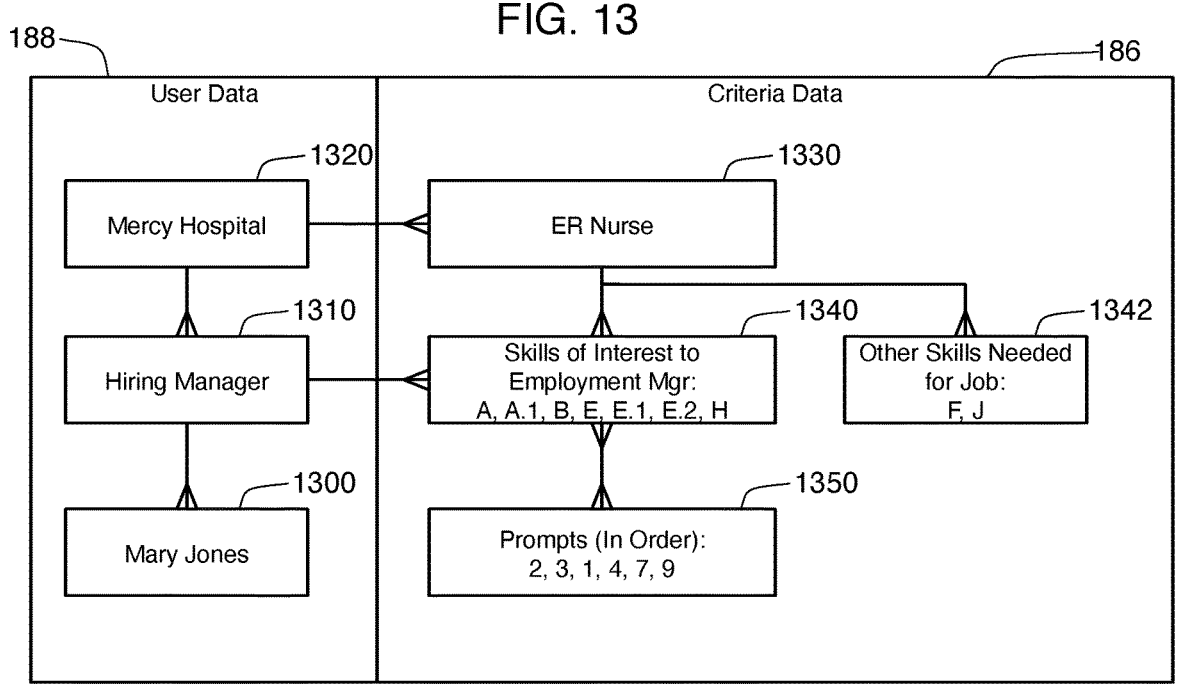

FIG. 26

First Individual

| | | |
|---|---|---|
| 1430 → Prompt Segment 1 | Time Segment 1a | |
| | Time Segment 1b | |
| | Time Segment 1c | |
| 1410 → Prompt Segment 2 | Time Segment 2 | |
| 1420 → Prompt Segment 3 | Time Segment 3a | |
| | Time Segment 3b | |
| | Time Segment 3c | |
| | Time Segment 3d | |
| | Time Segment 3e | |
| 1440 → Prompt Segment 4 | Time Segment 4a | |
| | Time Segment 4b | |
| 2630 → Prompt Segment 5 | Time Segment 5 | |
| 2640 → Prompt Segment 6 | Time Segment 6 | |

2600

Second Individual First Session

| | |
|---|---|
| 1430 → Prompt Segment 1 | Time Segment 1a |
| | Time Segment 1b |
| 1410 → Prompt Segment 2 | Time Segment 2a |
| | Time Segment 2b |
| | Time Segment 2c |
| 1420 → Prompt Segment 3 | Time Segment 3 |
| 1440 → Prompt Segment 4 | Time Segment 4a |
| | Time Segment 4b |
| 2630 → Prompt Segment 5 | Time Segment 5 |
| 2640 → Prompt Segment 6 | Time Segment 6 |

Second Individual Second Session

| | |
|---|---|
| 2710 → Prompt Segment 4.1 | Time Segment 4.1a |
| 2720 → Prompt Segment 2.1 | Time Segment 2.1a |
| | Time Segment 2.1b |

2700

AUTOMATIC VERSIONING OF VIDEO PRESENTATIONS

CROSS-REFERENCE TO RELATED CASES

The present application claims the benefit of provisional patent application 63/004,329, filed on May 1, 2020, which is hereby incorporated by reference in its entirety.

This application is also related to U.S. patent application Ser. No. 16/828,578, filed on Mar. 24, 2020, which claims the benefit of U.S. Provisional Application No. 62/824,755, filed Mar. 27, 2019. This application is also related to U.S. patent application Ser. No. 16/366,746, filed on Mar. 27, 2019, and U.S. patent application Ser. No. 16/366,703, filed on Mar. 27, 2019, and U.S. patent application Ser. No. 16/696,781, filed on Nov. 27, 2019. Each of these related applications are also hereby incorporated by reference in their entireties.

FIELD OF THE INVENTION

The present invention relates to a video booth or kiosk used to record audio, visual, and movements of an individual within the kiosk. More particularly, the present invention relates to creating custom versions of the recorded data at a booth based on a user's role in an organization, criteria associated with an objective for which the recording was made, and time segmentation of the recorded data.

SUMMARY OF THE INVENTION

In an embodiment, a method is included. The method can include a) recording first-individual data including visual data and audio data of a first individual, b) while recording the first-individual data, defining first-individual prompt segments based on timing information for a set of prompts presented to the first individual, c) dividing the first-individual data into first-individual video segments that temporally correspond to the first-individual prompt segments, d) receiving a first request from a first user computer to view first-individual data, the first request including first-user information, e) identifying first-individual prompt segments for the first user by identifying the first-individual prompt segments associated with a first-user subset of prompts identified for the first-user information, f) sending to the first user computer a first customized presentation can include the first-individual video segments corresponding to the first-individual prompt segments for the first user, g) recording second-individual data including visual data and audio data of a second individual and defining second-individual prompt segments based on timing information for the set of prompts presented to the second individual, h) dividing the second-individual data into second-individual video segments that temporally correspond to the second-individual prompt segments, i) receiving a second request from the first user computer to view second-individual data, j) identifying second-individual prompt segments for the first user by identifying the second-individual prompt segments associated with the first-user subset of prompts, k) sending to the first user computer a second customized presentation can include the second-individual video segments corresponding to the second-individual prompt segments for the first user, l) receiving a third request from a second user computer to view the first-individual data, the request including second-user information, m) identifying first-individual prompt segments for the second user by identifying the first-individual prompt segments associated with a second-user subset of prompts identified for the second-user information, the second-user subset of prompts being different than the first-user subset of prompts, n) sending to the second user computer a third customized presentation can include the first-individual video segments corresponding to the first-individual prompt segments for the second user.

In an embodiment, the visual data is received from a first camera and a second camera, further wherein each video segment includes audio data and preferred visual data received from one of the first and second cameras.

In an embodiment, each prompt segment is associated with preference data identifying the camera for the preferred visual data.

In an embodiment, at least one time segment is associated with each prompt segment, further wherein the video segments temporally correspond to the time segments.

In an embodiment, the video segments temporally correspond to the time segments on a 1-to-1 basis.

In an embodiment, a particular first-individual prompt segment is associated with a first time segment and a second time segment.

In an embodiment, the visual data recorded of the first individual is received from a first camera and a second camera, wherein preference data identifies a preferred video source for each time segment, further wherein the preference data identifies the first camera as the preferred video source for the first time segment and the second camera as the preferred video source for the second time segment, and still further wherein the first customized presentation switches between visual data received from the first camera and visual data received from the second camera during the two first-individual video segments corresponding to the particular first-individual prompt segment.

In an embodiment, a plurality of the time segments are scored, in part, based on behavioral sensor data.

In an embodiment, the method can further include recording a first user at the first user computer while viewing the first-individual video segments in order to determine an engagement score for each prompt segment, wherein a high-scoring prompt segment is associated with a high engagement score and a low-scoring prompt segment is associated with a low engagement score, wherein the second-individual video segments are sorted in the second customized presentation so that the high-scoring prompt segment appears before the low-scoring prompt segment as a result of the difference in engagement scores.

In an embodiment, the video segment for the low-scoring prompt segment is edited to remove video content as a result of the low engagement score.

In an embodiment, the subsets of prompts are identified for user information by first establishing a role for the user information and then identifying the prompts associated with the role, wherein the first-user subset of prompts are associated with a first role and the second-user subset of prompts are associated with a second role.

In an embodiment, the first-individual video segments for the first customized presentation are sorted according to an analysis of prior users associated with the first role before they are sent to the first user computer.

In an embodiment, the analysis of prior users includes analyzing preferred viewing orders when the prior users are permitted access to the video segments and allowed to select which video segments are viewed and in which order.

In an embodiment, the customized presentations relate to an objective database entity associated with a plurality of criteria defined in criteria database entities, wherein the objective and criteria database entities are stored in a data store.

In an embodiment, the customized presentations are based upon the plurality of criteria associated with the objective database entities, wherein a first set of criteria are identified with the first role, a second set of criteria are identified with the second role.

In an embodiment, each criteria is associated in the data store with at least one provided prompt, further wherein the subsets of prompts are identified for the user information by identifying the role for the user information, identifying the criteria for the identified role, and then identifying the prompts for the identified criteria.

In an embodiment, the criteria are associated in the data store to prompts on a many-to-many basis.

In an embodiment, the criteria are associated with skills required for a job, further wherein the first individual and the second individual are applicants for the job.

In an embodiment, a method is included. The method can include a) recording video data of an individual using a first camera and a second camera, b) while recording the video data, defining prompt segments based on timing information for a set of prompts presented to the individual, c) dividing the prompt segments into time segments based on an analysis of the video data, wherein a first prompt segment is divided into a first time segment and a second time segment, d) dividing the video data into video segments that temporally correspond to the time segments, wherein the first time segment includes video from the first camera and the second time segment includes video from the second camera, e) receiving a first request to view the video data from a first user, f) identifying a subset of prompts for the first user, g) identifying a plurality of time segments associated with the subset of prompts including the first and second time segments, and h) transmitting to the first user a customized presentation can include the video segments corresponding to the plurality of time segments.

In an embodiment, the method can further include scoring video segments based in part on analysis of a behavioral sensor, further wherein a subset of the video segments corresponding to the plurality of time segments are removed from the customized presentation based on the scoring.

BRIEF DESCRIPTION OF THE DRAWINGS

FIG. 11 is a schematic diagram showing a system granting access to audio and visual data segments to a user system.

FIG. 12 is a table showing the result of monitoring the use of the system of FIG. 11 by multiple users.

FIG. 13 is a schematic diagram showing the content of example criteria and user data generating ordered set of prompts for use in a presentation for the user.

FIG. 14 is a schematic diagram showing audio and visual segments forming the presentation based on the ordered set of prompts of FIG. 13.

FIG. 26 is a schematic diagram showing two recorded sessions for different individuals divided by prompt segments and time segments.

FIG. 27 is a schematic diagram showing a third recorded session for one of the individuals of FIG. 26, divided by prompt segments and time segments.

DETAILED DESCRIPTION

A system is presented below that records the activity of an individual, such as a job candidate, within a booth in order to create a customized presentation version of that recording and present that version to a user computer system. A hiring manager, potential future co-worker, or potential future supervisor of the job candidate are examples of users who will view this customized presentation during the process of hiring. The customized presentation is designed to efficiently showcase the relevant skills and qualities of the individual, showing the individual in the best possible light to the user. While the example context of employment evaluation has been mentioned so far, the system described herein is valuable in many other contexts.

During the video presentation, the individual responds to prompts, such as interview questions. The content of the recording is then segmented and analyzed according to these prompts. The prompts and the individual's performance in the segments of the recording determine which segments illustrate specific skills, and which segments show positive qualities of the individual, such as empathy, engagement, or technical competence.

The user's own preferences can be analyzed and used to design the customized presentation. In addition, the preferences of other users, such as other users in the same role as the user, can be used to modify the customized presentation.

As a result, the user is able to see the most relevant information to the user's objective, such as a job listing, early in the customized presentation. Information that is not relevant to the user is eliminated automatically from the customized presentation. The individual is shown to the user in the best possible light, with the skills important to that user or type of user emphasized in the customized presentation.

System 10

Figure 1:
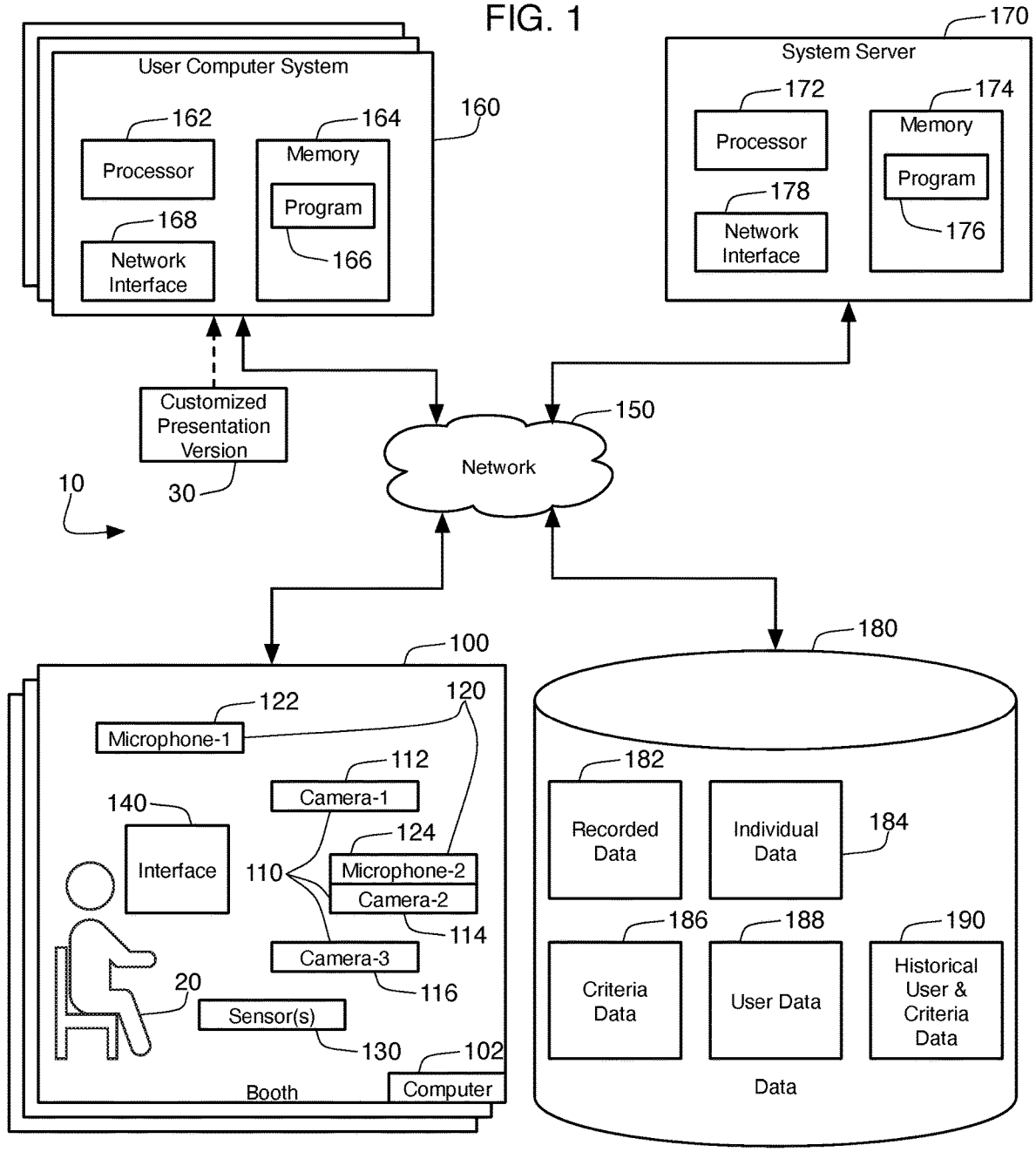
FIG. 1 is a schematic view of a system for implementing one embodiment of the present invention.

FIG. 1 shows a system 10 that records the activity of an individual 20 within a booth 100 in order to create a customized presentation version 30 of that recording and present that version 30 to a user computer system 160. Data recorded from the booth 100 is managed in part by a system server 170 and stored in data store 180. In the preferred embodiment, the system server 170 allows multiple user computer systems 160 to access data 180 from multiple booths 100, although the following discussion will primarily focus on the interaction between a single booth 100 and a single user computer system 170.

The booth or kiosk 100 is preferably an enclosed room that records high-quality audio and visual data of individual 20. The kiosk 100 houses multiple visual cameras 110, including a first camera 112, a second camera 114, and a third camera 116. Each of the cameras 110 is capable of recording visual data of the individual 20 from different angles. For example, the first camera 112 might record the individual 20 from the left side, while the second camera 114 records the individual 20 from the center and the third camera 116 records the individual 20 from the right side. The cameras 110 can be digital visual cameras that record data in the visible spectrum using, for example, a CCD or CMOS image sensor.

The kiosk 100 also houses at least one microphone 120 for recording audio. In FIG. 1, two microphones 122, 124 are shown in the kiosk 100. In some embodiments, the microphones 120 are embedded into and form part of the same physical component as a camera 110. In other embodiments, one or more of the microphones 120 are separate components that can be mounted apart from the cameras 110 within the kiosk 100. The sound data from the microphones 120 can be combined with the visual data from the cameras 110 into video (audio plus visual) material for later review of a user's recording session within the booth. The sound recorded by the microphones 120 can also be used for behavioral analysis of the individual 20. Speech recorded by the microphones 120 can be analyzed to extract behavioral data, such as vocal pitch and vocal tone, speech cadence, word patterns, word frequencies, total time spent speaking, and other information conveyed in the speaker's voice and speech. Additionally, the audio can be analyzed using speech to text technology, and the words chosen by the individual 20 while speaking can be analyzed for word choice, word frequency, etc.

The kiosk 100 also incorporates one or more depth sensors 130 that can detect changes in the position of the individual 20. Only one depth sensor 130 is shown in FIG. 1, but the preferred embodiment will utilize multiple depth sensors 130 aimed at different portions of the individual 20. The depth sensors 130 utilize one or more known technologies that are able to record the position and movement of the individual 20, such as stereoscopic optical depth sensor technology, infrared sensors, laser sensors, or even LIDAR sensors. These sensors 130 generate information about the facial expression, body movement, body posture, and hand gestures of individual 20. As explained in the incorporated patent application Ser. No. 16/366,703, depth sensors 130 can also be referred to as behavioral sensors, and data from these sensors 130 can be combined with information obtained from visual cameras 110 and microphones 120 to provide detailed behavioral data concerning the individual 20. This information can then be used to extrapolate information about the individual's emotional state during their recorded session in the booth 100, such as whether the individual 20 was calm or nervous, or whether the individual 20 was speaking passionately about a particular subject.

The kiosk 100 also includes one or more user interfaces 140. User interface 140 is shown in FIG. 1 as a display screen that can display content and images to the individual 20. Alternatively, the user interface 140 can take the form of a touchscreen that both displays content and accepts inputs from the user 20. In still further embodiments, the user interface 140 can incorporate multiple devices that can provide data to, or accept input from, the individual 20, including a screen, a touchscreen, an audio speaker, a keyboard, a mouse, a trackpad, or a smart whiteboard. In the embodiments described herein and in the incorporated documents, the user interface 140 is capable of providing prompts to individual 20, such as to answer a question. The interface 140 can also show a recorded or live video to the individual 20, or it can prompt the individual 20 to demonstrate a skill or talent.

A computer 102 at the booth is able to capture visual data of the individual 20 from the cameras 110, capture audio data of the individual 20 from the microphones 120, and capture behavioral data input from the depth sensors 130. This data is all synchronized or aligned. This means, for example, that audio information recorded by all of the microphones 120 will be synchronized with the visual information recorded by all of the cameras 110 and the behavioral data taken from the sensors 130, so that all the data taken at the same time can be identified and compared for the same time segment.

As explained in the incorporated provisional application, the computer 102 can actually be implemented using a plurality of separate, individual computers located at the booth 100. In the context of the present application, the computer 102 will nonetheless be referred to as a single device for ease in explaining the present invention.

The computer 102 is a computing device that includes a processor for processing computer programming instructions. In most cases, the processor is a CPU, such as the CPU devices created by Intel Corporation (Santa Clara, Calif.), Advanced Micro Devices, Inc (Santa Clara, Calif.), or a RISC processer produced according to the designs of Arm Holdings PLC (Cambridge, England). Furthermore, computer 102 has memory, which generally takes the form of both temporary, random access memory (RAM) and more permanent storage such a magnetic disk storage, FLASH memory, or another non-transitory (also referred to as permanent) storage medium. The memory and storage (referred to collectively as "memory") contain both programming instructions and data. In practice, both programming and data will be stored permanently on non-transitory storage devices and transferred into RAM when needed for processing or analysis. In some embodiments, the computer 102 may include a graphics processing unit (or GPU) for enhanced processing of visual input and outputs, or an audio processing board, a single chip audio processor, or a digital signal processor (or DSP) that accelerates the processing of audio inputs and outputs.

The computer 102 is tasked with receiving the raw visual data from the cameras 110, the raw audio data from the microphones 120, and the raw sensor data from the behavioral depth sensors 130. The computer 102 is also tasked with making sure that this data is safely stored. The data can be stored locally, or it can be stored remotely. In FIG. 1, the data is stored in data store (also referred to as data or database) 180. This database 180 includes defined database entities that may constitute database tables in a relational database. In other embodiments, these entities constitute database objects or any other type of database entity usable with a computerized database. In the present embodiment, the phrase database entity refers to data records in a database whether comprising a row in a database table, an instantiation of a database object, or any other populated database entity. Data within this database 180 can be "associated" with other data. This association can be implemented in a variety of techniques depending on the technology used to store and manage the database, such as through formal relationships in a relational database or through established relationships between objects in an object-oriented database. In some of the figures, relationships between database entities as shown using crow-foot lines to indicate the types of relationships between these entities.

Although this database 180 is showed as being connected to the booth 100 over network 150, this data 180 can be stored locally to the booth 100 and computer 102. To save storage space, audio and video compression formats can be utilized when storing data 180. These can include, but are not limited to, H.264, AVC, MPEG-4 Video, MP3, AAC, ALAC, and Windows Media Audio. Note that many of the video formats encode both visual and audio data. To the extent the microphones 120 are integrated into the cameras 110, the received audio and video data from a single integrated device can be stored as a single file. However, in some embodiments, audio data is stored separately the video data. Nonetheless, FIG. 1 shows audio, visual, and sensor data being combined as a single recorded data element 182 in data store 180.

The computer 102 is generally responsible for coordinating the various elements of the booth 100. For instance, the computer 102 is able to provide visual instructions or prompts to an individual 20 through one or more displays 140 that are visible to the individual 20 when using the booth 100. Furthermore, audio instructions can be provided to the individual 20 either through speakers (not shown) integrated into the booth 100 or through earpieces or headphones (also not shown) worn by the individual 20. In addition, the computer 102 is responsible for receiving input data from the user, such as through a touchpad integrated into interface 140.

The system 10 shown in FIG. 1 also includes a user computer system 160 and a system server 170. These elements 160, 170 are also computer systems, so they may take the same form as computer 102 described above. More particularly, these computing systems 160, 170 will each include a processor 162, 172, memory and/or storage 164, 174, and a network interface 168, 178 to allow communications over network 150. The memory 164, 174 is shown in FIG. 1 as containing computer programming 166, 176 that controls the processor 162, 172.

In FIG. 1, the system server 170 is represented as a single computing device. Nonetheless, it is expected that some embodiments will implement the system server 170 over multiple computing devices all operating together through common program as a single system server 170.

In some embodiments, the user computer system 160 takes the form of a mobile device such as a smartphone or tablet computer. If the user computer 160 is a standard computer system, it will operate custom application software or browser software 166 that allows it to communicate over the network 150 as part of the system 10. In particular, the programming 166 will at least allow communication with the system server 170 over the network 170. In other embodiments, the system 10 will be designed to allow direct communication between the user computer system 160 and the booth's computer 102, or even between the user computer system 160 and data 180. If the user computer 160 is a mobile device, it will operate either a custom app or a browser app 166 that achieves the same communication over network 150. This application or app 166 allows a user using user computer system 160 to view the audio and visual data 182 recorded by the booth 100 of individual 20. This app 166 receives this recorded data 182 in the form of a presentation 30 that is presented on a user interface of the user computer system 160, such as a screen or monitor and speakers. In the preferred embodiment, the particular presentation 30 of the recorded data 182 that is presented to the individual computer 160 is customized to make the presentation 30 as interesting and as relevant as possible for that particular user. That customization can be performed either by the system server 170 or the booth computer 102, and is performed in the manner described below.

Figure 2:
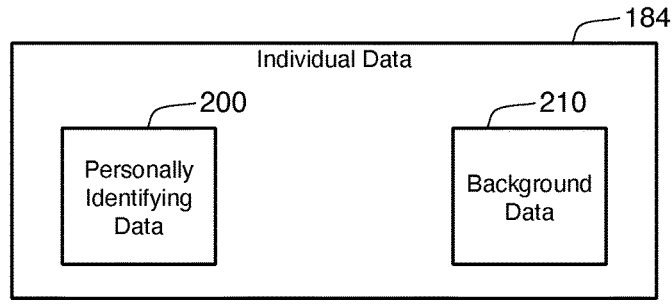
FIG. 2 is a schematic diagram showing the content of individual data.

In the preferred embodiment, the user computer system 160 requests a presentation 30 relating to an individual 20 through the system server 170. The user computer system 160 must identify an individual 20 for whom the booth 100 has recorded data 182. This can be accomplished by directly identifying the individual 20, or through a search or other data analysis techniques. Information about the individual 20 is stored in the data store 180 as individual data 184. As shown in FIG. 2, this individual data 184 can contain personally identifying information 200, such as the name of and the contact information for the individual 20, as well as background data 210. Note that even though FIG. 1 shows that both audio, visual and sensor data 182 and individual data 184 are found in the same data store 180, there is no need for all the data 180 to be physically or logically stored in a single structure. FIG. 1 merely schematically groups data 180 into a single element for ease in understanding the invention. Nonetheless, relationships between certain types of data 180 will drive the systems and methods described below, so it will be necessary to analyze and compare much of the data 180 shown with other data 180.

System 10 can be used in a variety of contexts to create and present custom presentations 30. In one context, the individual 20 can take the form of a candidate for an employment position. The user of the user computer system 160 can be a representative of a potential employer that is looking to fill a job opening. In this context, the background information 210 for the individual 20 may include resume type information, such as prior work experience, type of employment being sought, education background, professional training, awards and certifications, etc. Thus, the user computer system 160 may request that the system server 170 identify data 182 and create presentations for individuals 20 that are interested in employment opportunities at the user's workplace. In a second context, the individual might be a musician looking for performance opportunities, and the individual data 184 might include the instruments the musician plays, the type of music performed, available booking dates, and expected compensation.

In one embodiment, system server 170 collects data 182 from booth 100 and stores it in a central database (or other type of data store) 180. The system server 170 is preferably in communication with a plurality of other kiosks (not shown) and may aggregate all their data in a single database 180. In other embodiments, data from separate booth remains separated into separate data stores 180 that are located at each booth 100 but remain accessible to the system server 170.

Database 180 also contains criteria data 186. Criteria data 186 constitutes information that is of interest to the user of system 160 and is relevant to the data 182 acquired by the booth 100. In the context of an employment search, the criteria data 186 may containing data describing a job opening and the skills and experience requirements for the job. This is described in more detail below.

Database 180 also includes information or data 188 about the user of user computer system 160 (and other user computer systems 160 that connect to system 10 but are not shown in FIG. 1). This information 188 can be used to help customize the presentation 30 that is presented to user computer system 160. Finally, the database 180 maintains historical information 190 about previous criteria data 186 (such as data about previous job openings) and previous actions by users of user computer systems 160.

It is important that the system 10 secure the confidentiality of, and restrict access to, the data in its database 180. To accomplish this, no user computer 160 may access any of the data 180 unless the user computer 160 is fully authenticated and authorized. In one embodiment, user authentication and authorization is performed by the system server 170. In addition, data 180 is also secured against physical tampering or access. Encryption can also be used on data 180 when at rest, meaning that even if physical access is obtained to the data, all data relating to any specific individual 20 or user remains secure.

It is also important that every individual 20 who records a session at the booth 100 be fully aware of how their recorded data 182 will be used, stored, processed, and shared. This is typically accomplished through informational and contractual content that is provided to the individual 20. In this way, the system 10 will handle the data of the individual 20 only in a manner consistent with that agreed to by the individual 20.

Customized Versions of Presentation 30

The user of user computer system 160 is interested in viewing presentations 30 containing the audio and visual material recorded by individuals 20 in booth 100. This system 10 is useful in a variety of contexts in which users wish to view automatically customized presentations of the recordings made by one or more individuals 20. In the context of individuals 20 interviewing for potential jobs, for example, the user may be an employer looking to find job candidates. In another employment context, an employer may want to record and automatically edit a video of an employee of the month. Different viewers (users) within the employer organization will be interested in different aspects of the outstanding employee's (individual's) background and accomplishments. In the context of musicians 20 looking for work, the user may work at a venue looking to book an act, or be an agent looking for new clients, or a band manager looking for new band members. In the context of students applying for scholarships, the users may be different members of a scholarship committee that are each interested in different aspects of the student's history, personality, or skills. In the context of a non-profit requesting a grant, the users may be directors of a community foundation. And finally, in the context of a politician looking to win an election, the users could be voters, each of whom are interested in different aspects of politician's personalities and positions.

If we were to consider an employer looking to find job candidates, it is likely that multiple users at a single employer would be asked to review a plurality of job candidates. Each of these users is interested in seeing the audio and visual data of the candidates 20 recorded at booth 100. However, these users may not be interested in the same aspects of the recorded sessions. This is especially true when a large number of job candidates 20 must be reviewed, and users do not have the time to review the entire recording session of all potential candidates 20.

In one example, an employment manager user may be interested in general questions about how a candidate deals with adversity, handles problems in the workplace, and responds to questions about relocation. The candidate's future boss, however, may be most interested in whether the candidates have the technical ability to handle the requirements of the job. In contrast, future colleagues and co-workers may have a lesser interest in the individual's technical background but would like to see portions of the recorded sessions that are most likely to reveal the personality of the candidate.

System 10 is able to meet these differing needs of the users by generating different "stories" or "versions" 30 of the recorded sessions appropriate for each user. As explained in detail below, each version or story 30 is created for a user based on the user's role in the process, and perhaps upon their past use of the system 10. Although preference parameters can be selected by the user to force a particular configuration of the version 30 to be presented to that user, the embodiments presented below are designed to automatically generate a customized version 30 of the recorded session without manual selection of detailed preference parameters.

The system 10 and methods described below can be applied to the recorded data 182 of a variety of individuals 20. In the context of a job interview, a user of user computer system 160 would desire to see recorded sessions for multiple individuals 20. The method for creating custom presentations 30 for that user can be applied to the recorded sessions of each individual 20. Using this system 10, the user will automatically only see a portion of each candidate's session, and the portion chosen will be consistent across individuals 20 according to methods described below. An employment manager, for instance, would be shown each individual's answers to prompts on how the individual 20 deals with adversity, handles problems in the workplace, and responds to questions about relocation. A different user, such as a co-worker, would see answers to prompts that are written to elicit information that reveals the personality of the candidate.

Audio, Visual, and Sensor Data 182

Figure 3:
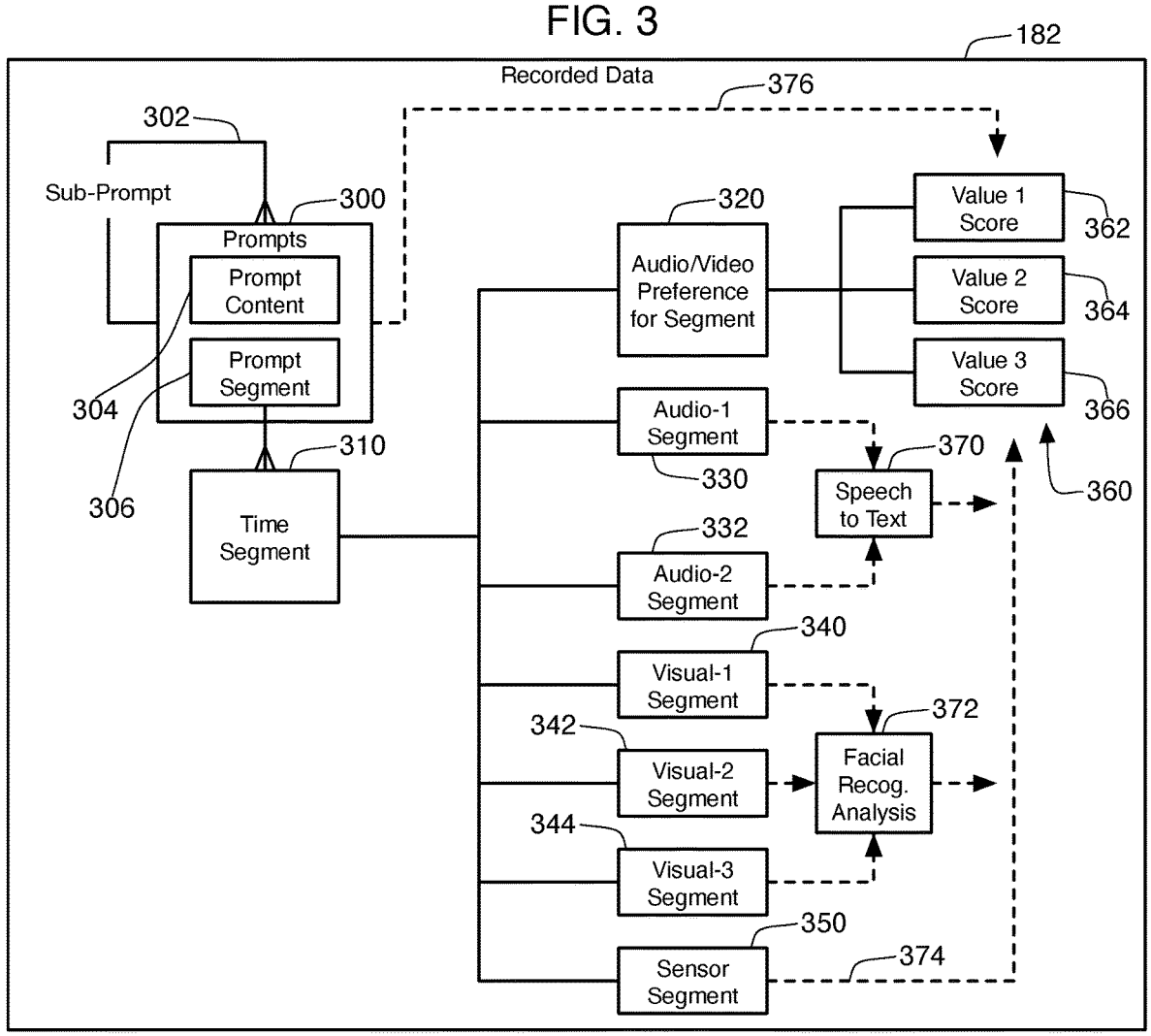
FIG. 3 is a schematic diagram showing the content of audio, visual, and sensor data.

FIG. 3 shows details about the recorded 182 that is maintained about a recorded session of the individual 20 at the booth 100. Part of this information is the content 304 and timing 306 of prompts 300, which are the instructions that were provided to the individual 20 during the recording. These instructions can take a variety of forms depending on the type of session that is being recorded for the individual 20. In one embodiment, the booth 100 is being used to conduct an automated employment interview with the individual 20. To begin the interview, the individual 20 sits on a seat in front of the cameras 110, microphones 120, and depth sensors 130. The height and position of each of the cameras 110 and the depth sensors 130 may be adjusted to optimally capture the recorded data 182. Prompts (usually instructions or questions) are provided to the individual 20, either audibly or through the visual interface screen 140 (or both). For example, in the context of an automated interview for a medical job, the prompts might include:

1) Why did you choose to work in your healthcare role?
2) What are three words that others would use to describe your work and why?
3) How do you try to create a great experience for your patients?
4) How do you handle stressful work situations?
5) What would it take for you to move somewhere else for a job (Salary, location, organization, etc.)
6) What is your dream job in healthcare?
7) Tell us about a time you used a specific clinical skill in an urgent situation (describe the situation and skill).
8) What area of medicine to you consider yourself a specialist in? Why?

The prompt data 300 contains information about the content 304 of each prompt given during the recorded session of the user 20. In addition, the prompt data 300 contains information 306 about the timing of these prompts. The timing of these prompts 306 can be tracked in a variety of ways, such as in the form of minutes and seconds from the beginning of a recorded session. For instance, a first prompt may have been given to the individual 20 at a time of 1 minute, 15 seconds (1:15) from the beginning of the recorded session. Note that this time may represent the time at which the first prompt was initiated (when the screen showing the prompt was first shown to the user 20 or when the audio containing the prompt began). Alternatively, this time may represent the time at which the prompt was finished (when the audio finished) or when the user first began to respond to the prompt. A second prompt may have been given to the individual 20 at a time of 4 minutes, 2 seconds (4:02), the third prompt at 6 minutes, 48 seconds (6:48), etc. The time between prompts can be considered the prompt segment 306. The prompt segment 306 may constitute the time from the beginning of one prompt to the beginning of the next prompt, or from a time that a first prompt was finished to a time just before the beginning of a second prompt. This allows some embodiments to define the prompt segments 306 to include the time during which the prompt was given to the individual 20, while other embodiments define the prompt segments 306 to include only the time during which the individual responded to the prompt. Regardless of these details, the prompt data 300 contains the timing information necessary to define prompt segments 306 for each prompt 300.

Prompt data 300 in data store 180 includes the text or audio of the instructions provided to the individual (or an identifier that uniquely identifies that content) and the timing information needed to define the prompt segments 306. Note that, even in situations where multiple individuals 20 receive the exact same prompts during their recorded sessions in the booth 100, the timing information for the prompt segments 306 will differ from individual to individual based upon the time taken to respond to each prompt. This means that the first prompt segment (the prompt segment for the first prompt) for a first individual 20 may run from location 1:15 (1 minute, 15 seconds from the beginning of the recorded session) to 3:45, while the first prompt segment for a second individual 20 may run from 1:53 to 7:12. Thus, the prompt data 300 is specific to each individual 20, and will therefore be associated with individual data 184. Further note that in the remainder of this disclosure, figure number 300 will be used to refer to both the overall prompt data 300 as well as the textual or audio prompts 300 given to the user and stored in the prompt data 300.

In some contexts, prompts 300 can be broad, general questions or instructions that are always provided to all individuals 20 (or at least to all individuals 20 that are using the booth 100 for the same purpose, such as applying for a particular job or type of job). In other contexts, the computer 102 can analyze the individual's response to the prompts 300 to determine whether additional or follow up prompts 300 should be given to the individual 20 on the same topic. For instance, an individual looking for employment may indicate in response to a prompt that they have experience with data storage architecture. This particular technology may be of interest to current users that are looking to hire employees in this area. However, one or more of these potential employers want to hire employees only with expertise in a particular sub-specialty relating to data storage architecture. The computer 102 may analyze the response of the individual 20 in real time using speech-to-text technology and then determine that additional prompts 300 on this same topic are required in order to learn more about the technical expertise of the individual 20. These related prompts 300 can be considered "sub-prompts" of the original inquiry. In FIG. 3, it is seen that prompts 300 can be related to other prompts 300 by being connecting through sub-prompt links 302. These sub-prompts can be treated like any other prompt 300 by system 10, but their status as sub-prompts can help with the analysis of the resulting recordings. Although sub-prompts are like all other prompts 300, this disclosure will sometimes refer to sub-prompts using figure number 302.

The individual 20 typically provides oral answers or responses to the prompts 300, but in some circumstances the individual 20 will be prompted to do a physical activity, or to perform a skill. In any event, the individual's response to the prompt 300 will be recorded by the booth using cameras 110, microphones 120, and depth data sensors 130. The booth computer 102 is responsible for providing prompts 300 and therefore can easily ascertain the timing at which each prompt 300 is presented. This timing information can be used in order to divide the entire session recorded by the cameras 110, microphones 120, and sensors 130 into separate segments. The temporal definition of each segment is stored in time segment data 310. In other words, the time during which the individual 20 responds to each question becomes the various time segments 310, with each prompt 300 serving as the dividing points between time segments 310. In other words, each time segment 310 can correspond to a single prompt segment. If twelve prompts 300 are presented to the individual 20, a separate time segment 310 will be defined for each response resulting in twelve separate segments 310 being identified, one for each of the twelve prompt segment. Time segments 310 do not need to correspond exactly to prompt segments 306. For example, an additional time segment 310 can be associated with the time before the first question and after the last question is fully answered, which would create fourteen time segments 310 for a session that contains only twelve separate prompt segments 306.

Although determining when certain instructions 300 are provided to the individual 20 is one of the best ways to divide up the time segment data 310, it is not the only way. The incorporated Ser. No. 16/366,746 patent application (the "'746 application"), for example, describes other techniques for defining time segments 310. This application described these techniques as searching for "switch-initiating events"

that can be detected in the content of data recorded at the booth 100 by the microphones 110, cameras 120, and sensors 130. While the Ser. No. 16/366,746 patent application primarily defines switch-initiating events in the context of switching cameras, these events are equally useful for dividing the time segment data 310 into different time segments 310. As explained in the '746 application, behavioral data analysis can be performed on this data to identify appropriate places to define a new time segment 310. For example, facial recognition data, gesture recognition data, posture recognition data, and speech-to-text can be monitored to look for switch-initiating events. If the candidate turns away from one of the cameras 110 to face a different camera 110, the system 10 can detect that motion and note it as a switch-initiating event which will be used to create a new time segment 310. Hand gestures or changes in posture can also be used to trigger the system 10 to cut from one camera angle to a different camera angle, which also constitutes a dividing event between time segments 310. Another type of switch-initiating event can be the passage of a particular length of time. A timer can be set for a number of seconds that is the maximum desirable amount of time for a single segment, such as 90 seconds. Conversely, a minimum time period (such as 5 seconds) may also be established to prevent each segment 310 from being too short.

In one embodiment, the prompt segments 306 defined according to when prompts 300 are provided to the individual 20 are used to create a first set of time segments 310. Switching events detected within each prompt segment can then be used to split one time segments 310 into multiple time segments 310. For example, the '746 application explains that the identification of low-noise event can be considered a switch-initiating event. If an average decibel level over a particular range of time (such as 4 seconds) is below a threshold level (such as 30 decibels), this will be considered a low noise audio segment that can be used to subdivide time segments 310. In the context of an interview, one time segment 310 can originally be defined to cover an entire prompt segment (such as the entire response the individual 20 provided to a first prompt 300). If a low-noise event is identified within that response, that time segment 310 is split into two different time segments—one before the low-noise event and one after the low-noise event. Furthermore, the '746 application describes the option to remove extended low volume segments or pauses from an audiovisual presentation altogether. If time segment 310 were divided into two using this technique, the first of these new time segments 310 would be the time before the beginning of the low noise event, and the second time segment would be the time after the low-volume segment or pause is completed, thereby removing the low volume segment from any of the defined time segments 310. This would, of course, lead to two (or more) time segments 310 being associated with the prompt segment for a single prompt 300. This can be seen in FIG. 3 by the use of crow's foot notation showing links between separate data elements. This same notation shows that, at least for the embodiment shown in FIG. 3, each time segment corresponds to a single audio segment for each microphone 120 and a single visual segment for each camera 110.

As shown in FIG. 3, each time segment 310 is also associated with preference or metadata 320, audio data 330, 332, visual data 340, 342, 344, and sensor data 350. The two audio segments 330, 332 represent the audio data recorded by each of the two microphones 122, 124, respectively, during that time segment 310. Similarly, three visual segments 340, 342, 344 comprise the visual data recorded by each of the three cameras 112, 114, 116, respectively, during that segment 310. The sensor segment 350 constitutes the behavioral and position data recorded by sensor 130. Obviously, the number of separate audio segments 330, 332, visual segments 340, 342, 344, and sensor segments 350 depends upon the actual numbers of microphones 120, cameras 110, and sensors 130 that are being used to record the individual 20 in the booth, as there is a one-to-one relationship between the separate data elements (330-350) for a time segment 310 and the recording devices 110, 120, 130 recording the individual 20.

The preference data 320 for a time segment 310 can contain different types of data for that segment 310. One benefit of having multiple cameras 110 and multiple microphones 120 in booth 100 is that it is possible to utilize visual material from different cameras 110 and audio material from different microphones 120 and arrange them automatically into a single audiovisual presentation. The resulting presentation cuts between different camera angles to create a visually interesting presentation 30. In addition, the presentation 30 can use the recording from whichever microphone best captured the audio for a particular time segment 310. Because all the data from the recording devices 110, 120, 130 are time synchronized, the creation of time segments 310 will automatically lead to the parallel segmentation of the audio data into segments 330, 332 and the visual data into segments 340, 342, 344 using the same timing information. While each time segment 310 is associated with segments 320-350 from all of the recording devices 110, 120, 130, the system 10 can select the preferred audio and visual data source for that segment 310 and store that preference in preference data 320. Thus, the preference data 320 for a first segment 310 might indicate the best audio is the audio-2 segment 332 from microphone-2 124 and that the best visual information is visual-3 segment 344 from camera-3 116. In the very next time segment 310, the preference data 320 may indicate the preferred audio is the audio-1 segment 330 from microphone-1 122 and the best visual information is visual-1 segment 340 from camera-1 112.

The preferred audio and visual data for the segment can together be considered the video (audio data plus visual data) or preferred video for that segment. In one embodiment, the video for a time segment 310 is stored merely in the preference data 320. Even after the selection of the preferred audio and visual data, all audio segments 330, 332 and all visual segments 340, 342, 344 are stored and retained in recorded data 182. One benefit of this approach is that alternative techniques can be provided after the fact to alter the selection of the preferred audio or visual segment. In another embodiment, once the preferred audio and visual data are selected, only that data is stored permanently in recorded data 182 as the video data for that time segment 310. One benefit of this approach is that it significantly reduces the amount of data stored in recorded data 182

Selecting either microphone-1 122 or microphone-2 124 to be the preferred audio source for a particular time segment 310 likely requires an analysis of the sound quality recorded in each segment 330, 332. In some instances, the highest quality audio segment 330, 332 might be the one with the highest volume, or least amount of noise (the best signal to noise ratio as determined through estimation algorithms). In instances where microphones 120 are embedded into cameras 110, or where each microphone 120 is located physically close to a single camera 110, the preferred audio source can be the microphone 120 associated with the camera 110 that took the preferred visual data.

Selecting the best visual presentation for a time segment 310 can be more difficult but can still be automatically determined. For example, the data captured from the multiple cameras 110 can be analyzed to determine whether a particular event of interest takes place. The system 10 may, for instance, use facial recognition to determine which camera 110 the individual 20 is facing at a particular time and then select the visual segment 340, 342, 344 for that camera. In another example, the system 10 may use gesture recognition to determine that the individual 20 is using their hands when talking. In this circumstance, the system 10 might then select the visual segment 340, 342, 344 that best captures the hand gestures. If the individual 20 consistently pivots to the left while gesturing, a right camera profile shot might be subjectively better than minimizing the candidate's energy using the left camera feed. In other situations, a single prompt segment has been divided into separate time segments 310, and the selection of the visual segment 340, 342, 344 is based simply on ensuring a camera change when compared to the selected source camera 110 for the previous time segment 310. Either the computer(s) 102 at the booth 100 or the system server 170 can be responsible for analyzing the data and selecting these preferences 320 on behalf of the system 10.

By linking each time segment 310 in data 182 with the prompts 300, the relationship between prompts 300 and time segments 310 can be maintained even if a time segment 310 originally associated with an entire prompt 300 has been split into multiple segments 310. Thus, if a presentation is to show all of an individual's answer to a particular prompt 300 (such as question number seven in an interview), all time segments 310 for that prompt segment can be immediately identified and presented. During that presentation, the microphone 120 that recorded the audio and the camera 110 recording the visual data can vary and switch from one time segment 310 to another 310 within the answer based on the source choices stored in the preference data 320.

In incorporated patent application Ser. No. 16/366,703 (the "703 application"), a system and method for rating interview videos is presented. For example, this '703 application teaches the creation of an empathy score by examining visual, audio, and depth sensor data of an interview candidate during a recording session at a booth. This incorporated application also describes the creation of a combined score that incorporates the empathy score with an evaluative score based on considering an applicant's attention to detail and career engagement. Regardless of the technique used, it is possible to create an overall evaluation score for various individuals that have recorded sessions at booth 100. The same techniques described in the '703 application can be utilized to create an empathy score for a time segment 310 of video. When this is performed, the resulting score 360 is stored within or in connection to the preference data 320.

In FIG. 3, three different scores 360, namely value 1 score 362, value 2 score 364, and value 3 score 366 are shown as being recorded for each segment 310. Examples scores 360 may relate to various attributes that can be analyzed and rated using the data collected by the booth 100. For example, the scores 362, 364, 366 may be for empathy, engagement, or technical competence. Other possible scores include confidence, sincerity, assertiveness, comfort, or any other type of personality score that could be identified using known techniques based on an analysis of visual data, audio data, and depth sensor/movement data. In the embodiment shown in FIG. 3, a separate score 360 is determined for each time segment 310. In other embodiments, all time segments 310 for a single prompt 300 can be analyzed and scored together as a single unit.

In the '703 application, the sensor data for a segment is integral for determining the empathy score. The depth sensor, such as sensor 130, records the body movements, posture, hand movements, leg movements, and sometimes even facial features and reactions of an individual 20 during a recording session. Data 350 from this depth sensor 130 reveals a great deal of information about the behavior of the individual 20, and therefore is frequently used for creating scores 360 for a time segment 310. Thus, dotted line 374 is included in FIG. 3 to show that the sensor segment data 350 is one of the criteria used to create the scores 360. This data 350 can also be combined with other data, such as visual segment data 340, 342, 344 or audio segment data 330, 332, in order to develop a deeper understanding of the individual's behavior. For example, depth sensor data 350 can be combined with facial recognition and analysis data 372 that is generated by analyzing the various visual data segments 340, 342, 344. This allows for a better understanding of the facial reactions and expressions of the individual 20. Thus, the facial recognition and analysis data 372 is also shown as contributing to the creation of scores 360. In other embodiments, audio segment data 330, 332 is analyzed, as pitch and tone can indicate the stress and comfort level of the individual 20 during the recording session. In still further embodiments, the audio segment data 330, 332 is converted to textual data 370 (using speech-to-text technology), and the textual data becomes part of the behavior analysis. This type of scoring is further described in the incorporated patent applications identified above.

In some instances, the timing or content of a particular prompt 300 asked of the individual 20 impacts the resulting scores 360 created for a time segment 310. For example, when the individual 20 is responding to the first question or instruction 300, the system 10 can use data from that time segment 310 as a baseline to compare the answers from the beginning of the session to the answers later in the session. As another example, a particular instruction 300 can be designed to stimulate a type of emotional response from the individual 20, or it can be designed to prompt an individual 20 to talk about their technical expertise in a particular field. Data acquired while the individual 20 is responding to that instruction 300 can be given more weight in certain types of scoring 360. Thus, for instance, answers to questions concerning technical expertise may automatically be given a higher "technical" score 360. In this way, it can be crucial to analyze the audio data 422, the visual data 432, and the sensor data 434 in the context of prompts 300 when creating scores 360, which is why dotted line 376 is also shown in FIG. 3.

Figure 4:
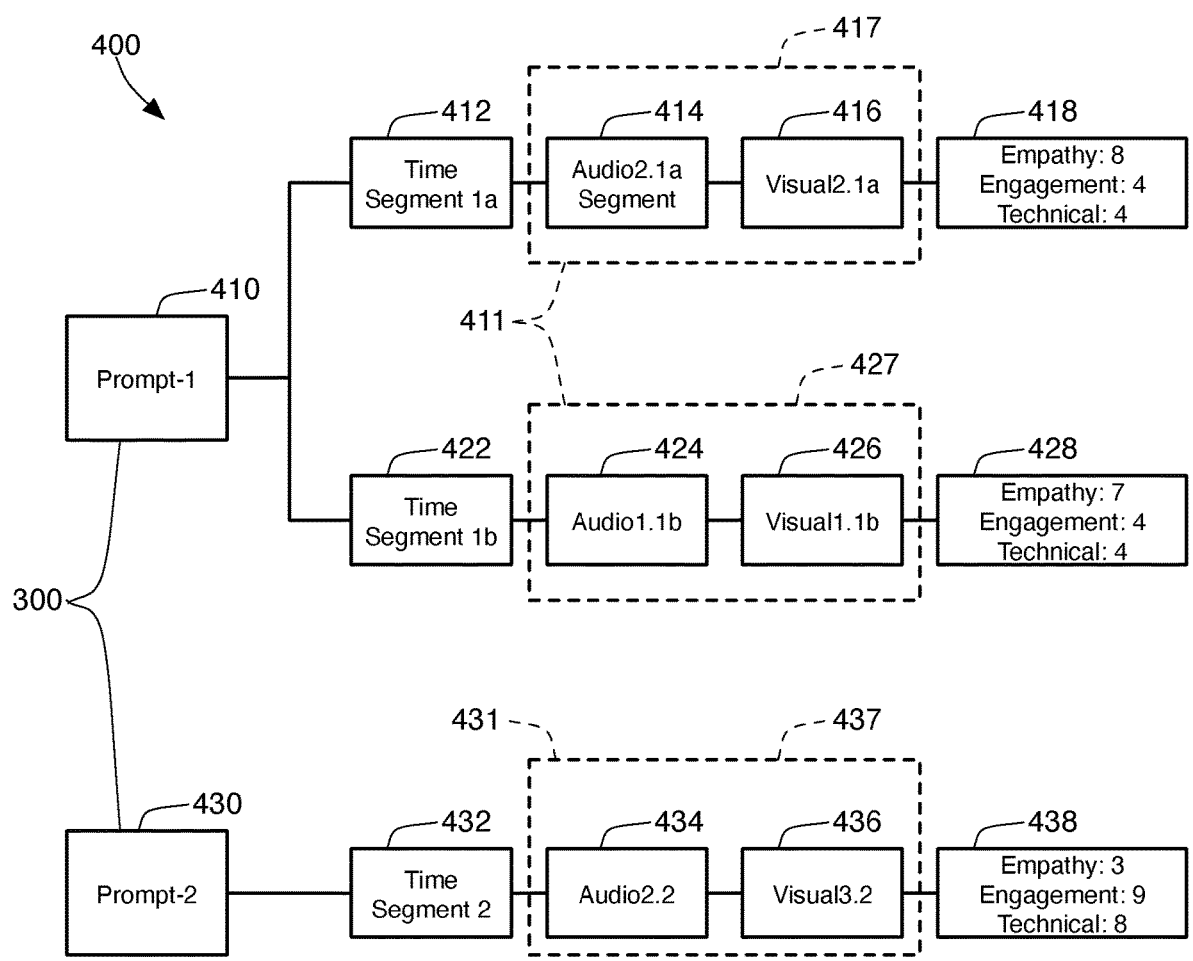
FIG. 4 is a schematic diagram showing an example relationship of a portion of the audio, visual, and sensor data.

FIG. 4 shows another example of how the audio-visual data 182 of FIG. 3 can be visualized. In this case, the data 400 shows the recorded responses of an individual 20 to two prompts 300, namely prompt-1 410 and prompt-2 430. Prompt-1 410 has been divided into two time segments, segment 1a 412 and segment 1b 422. This division may occur as described above, such as by identifying a low noise portion of the recording in the answer to prompt-1 410. The preference data for time segment 1a 412 indicates that audio segment 2.1a 414 is the preferred audio for this time segment 412. The '2' before the decimal point on element 414 indicates that this audio data is from the second microphone, or microphone-2 124. The '1' after the decimal point indicates that this is associated with prompt-1. The following 'a' indicates that this is the first time segment 412 from prompt-1 410. The '1a' can also be interpreted to reveal that the segment 414 relates to time segment 1a 412, which is the first time segment 412 for prompt-1 410. Similarly, visual segment 2.1a 416 is the preferred visual data. Visual segment 2.1a is from camera-2 114 (the '2' before the decimal point) and is for time segment 1a 412. The combination of the preferred audio segment 2.1a 414 and the preferred visual segment 2.1a 416 constitutes the video data 417 for time segment 1a 412, with the term video referring to the combination of audio and visual data. Preference data (at element 418 in FIG. 4) also indicates that this time segment 412 is associated with an empathy score of 8, an engagement score of 4, and a technical score of 4.

The preference data 320 for time segment 1b 422 indicates a preference for audio data 424 from microphone-1 122 and visual data 426 from camera-1 112. This combination of audio and visual data 424, 426 creates video segment 427 for time segment 1b. Time segment 1b 422 is also associated with scores of 7, 4, and 4 for empathy, engagement, and technical competence, respectively.

The video segments 417 and 427 for time segment 1a 412 and time segment 1b 422, respectively, together comprise the video segments 411 for prompt-1 410. In other words, the video for the prompt segment of prompt-1 410 can be presented by first presenting the video segment 417 for time segment 1a 412 and then presenting the video segment 427 for time segment 1b 422.

The data for prompt-2 430 is associated with only a single time segment 432. For this time segment 432, audio data 434 from microphone-2 124 and visual data 436 from camera-3 116 are preferred, and together form the video segments 431 for prompt-2 430. It is also true that audio2.2 434 and visual3.2 436 together form the video segment 437 for time segment 2 432, as the video 437 for the time segment 432 is the same as the video 431 for the entire prompt-2 430. The scores 438 for time segment 432 are 3, 9, and 8, respectively.

Method for Establishing Recorded Data

Figure 5:
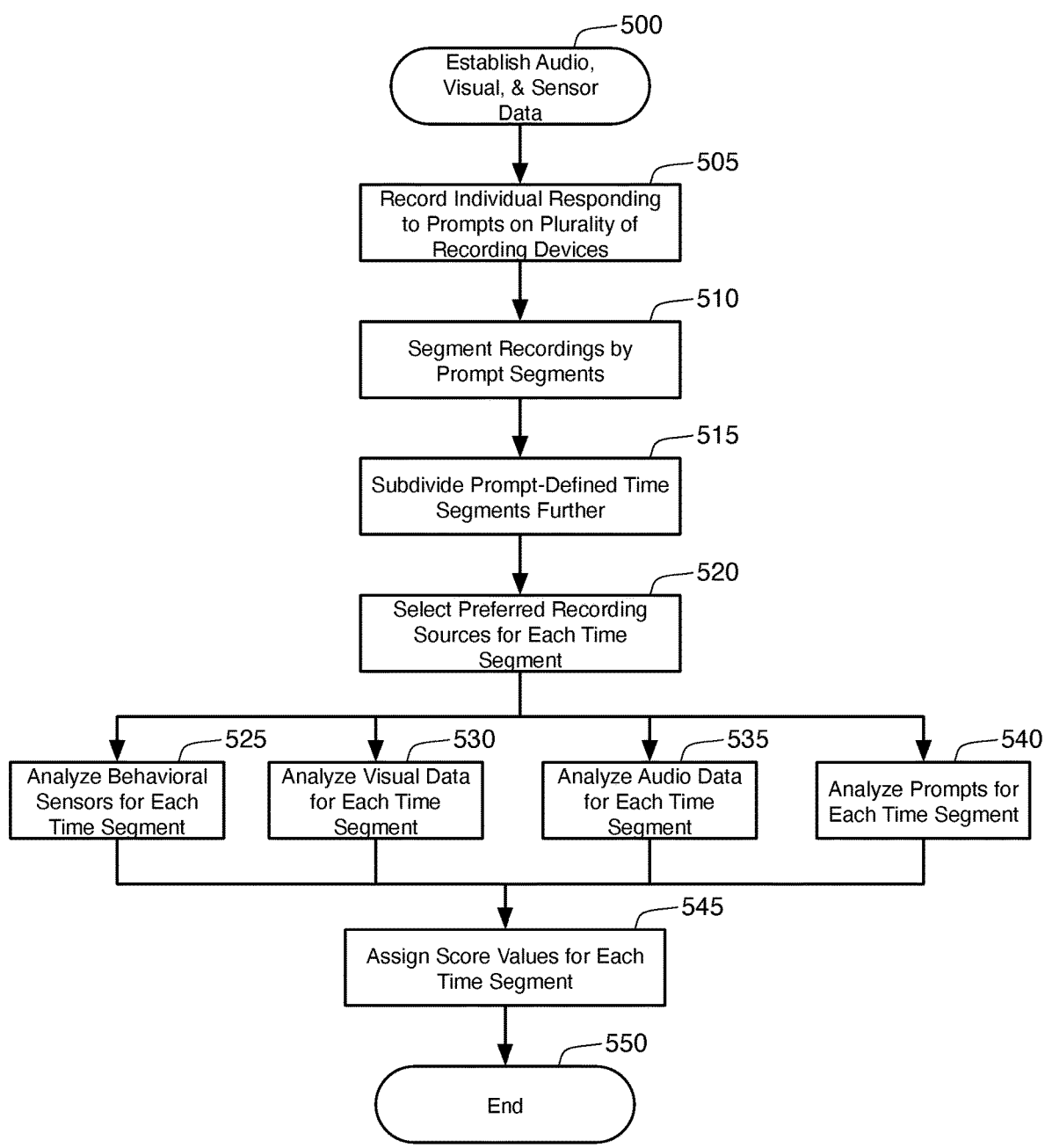
FIG. 5 is a flow chart showing a process of establishing the audio, visual, and sensor data.

FIG. 5 shows a method 500 for establishing the recorded data 182 in data store 180. The method 500 begins at step 505, in which a session is recorded at booth 100 of an individual 20 responding a plurality of prompts 300. The individual 20 is recorded with one or more cameras 110, one or more microphones 120, and one or more behavioral sensors (depth sensing devices) 130. Prompts 300 are provided to the individual 20, and the timings and content of the prompts 300 are recorded along with the data from the cameras 110, microphones 120, and the behavioral sensors 130 at step 505.

At step 510, the timings of the prompts 300 are used to divide the individually recorded data from the cameras 110, microphones 120, and the behavioral sensors 130 into separate segments for each prompt segment 306. As explained above, some of these prompt segments 306 are subdivided into multiple time segments 310, such as by identifying switching events as explained above. This occurs at step 515. In some circumstances, prompt segments 306 will consist of only a single time segment 310.

At step 520, the preferred source is selected between the cameras 110 and between the microphones 120 for each time segment 310. This allows for "switching" between cameras 110 during a presentation 30 to make the presentation 30 more interesting, and also allows for the best microphone 120 to be separately selected for each time segment 310.

Next, the method 500 needs to calculate scores 360 for each of the time segments 310. To accomplish this, step 525 analyzes data from the behavioral (or body position) sensors 130. Similarly, step 530 analyzes visual data from the cameras 110. Step 535 analyzes audio data from the microphones 120, which includes both pure audio data and text derived from the recorded audio data. Step 540 analyzes information about the relevant prompt 300. In some embodiments, two or more of these analyses 525-540 are combined in order to create one or more score values 360 for the time segments 310 at step 545. In other embodiments, each of these analyses 525-540 creates separate score values 360. The method then ends at step 550.

It is not necessary to perform all of these steps to properly perform method 500. For example, some embodiments will not perform all four types of analyses 525-540 to generate the score values 360. In fact, steps 525-540 can be skipped altogether. In still further embodiments, step 515 is skipped, and the segmentation of recordings by prompts 300 as performed by step 510 is all that is necessary to create the time segments 310. The ability to skip some steps is also found in the other methods described in this disclosure. The true scope of any method protected by this disclosure is determined by any claims that issue herefrom.

Criteria Data 186 and User Data 188

Figure 6:
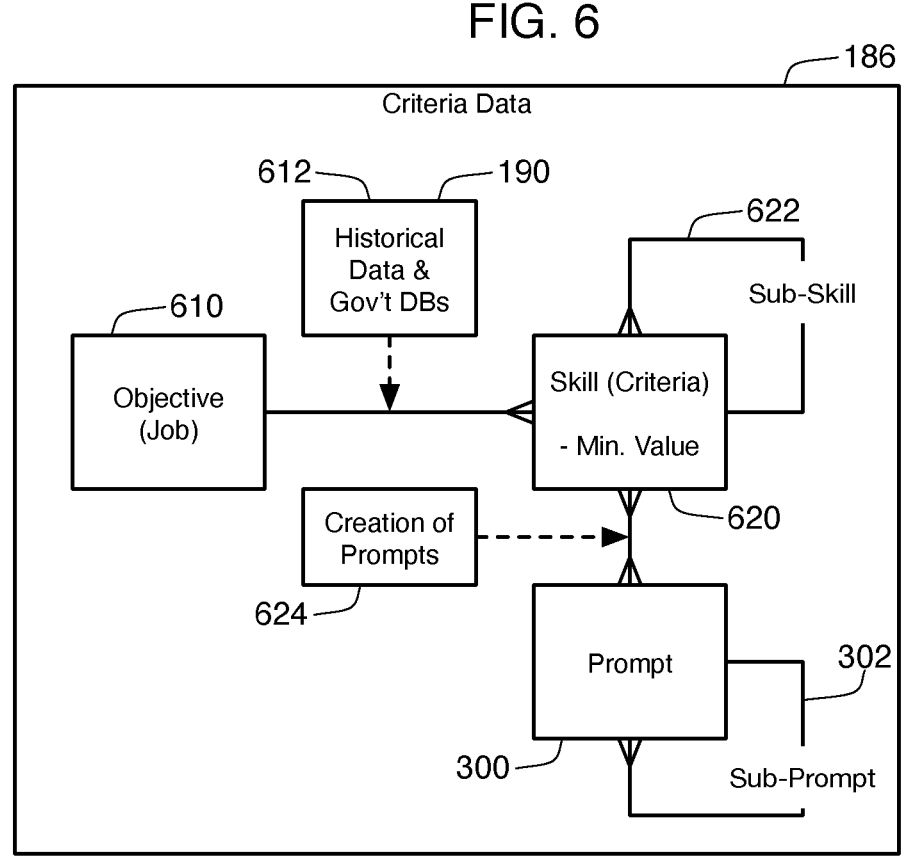
FIG. 6 is a schematic diagram showing the content of criteria data.

FIG. 6 provides a schematic illustration of the criteria data 186 maintained by system 10. Criteria data 186 establishes the criteria by which individuals 20 are analyzed to determine suitability for some opportunity made available by the user of user computer system 160. As explained above, this user may be looking to find a performer for a performance at a venue that they operate. Alternatively, the user may be looking to hire an employee for a job that is open in their enterprise. To help the system 10 identify individuals 20 that may be of interest to the user, the user will establish the criteria data 186. In addition to identifying individuals 20, this same criteria data is utilized to help customize, order, and edit the presentations 30 that are presented to the user. This is explained in further detail below.

The criteria data 186 defines one or more objectives 610. In the context of a job search, the objective may be a job 610. The objective data 610 may identify the employer or user offering this job, the price range, the location, etc. The criteria data 186 will associate each objective 610 with one or more skills or criteria 620 that the individual 20 must have in order to qualify for the objective 610. In the preferred embodiment, multiple skills 620 are associated with each objective 610, which is again shown by the crow's foot notation in FIG. 6.

For example, one objective may take the form of a job opening for an emergency room nurse. The description about the job, its location, the estimated compensation, and other data would be stored in the objective database entity 610. This objective or job 610 will have certain requirements that candidates must meet before they are considered qualified. These requirements constitute the objective's criteria or skills and will be stored in the criteria database entities 620. These criteria 620 might include being a registered nurse, having experience in a hospital emergency room, and having experience with certain types of medical technology. Each of these criteria 620 might be also associated with a minimum value, such as five years of experience as a registered nurse, one year of experience in an emergency room setting, and a particular certification level on the medical technology.

In some cases, criteria 620 can be considered sub-skills or specialty skills of other criteria 620, thus they are shown in FIG. 6 as being linked to other criteria 620 through sub-skill link 622. Although sub-skills are like all other skills 620, this disclosure will sometimes refer to sub-skills using figure number 622.

In a first embodiment, the entity that creates the objective or job 610 is responsible for picking and linking the related skills 620 in data 186. In a preferred embodiment, however, various objectives 610 are predefined in the criteria data. For example, since many hospitals may use the system 10 to help find candidates for an emergency room nurse job, predefined data 610 and skills 620 can be set up in the system for that job and its typical skill requirements. To identify the appropriate skills 620 for this type of a job, it is possible to consult government databases 612 that define numerous jobs and known criteria/pre-requisites for those jobs. Information from that database 612 will be used to link the objective data 610 with the prerequisite skills 620.

In addition, it is possible to use historical data 190 maintained by the system 10 to predefine certain objectives 610 and their related criteria 620. Previous employers may have used the system 10 to establish objectives 610 including job openings for emergency room nurses. In addition, experts can predefine objectives 610 and their related criteria 620 in the system 10, which can form another contribution to the historical data 190 of the system 10. This historical data 190 will store this information, as well as the criteria 620 that was established by those previous employers for these types of jobs 610.

When a user decides to create a new objective for an emergency room nurse position, the predefined data from the government data 612 and the historical data 190 are ready. The system 10 is able to use this data 612, 190 to automatically suggest skills 620 and minimum values required for the new objective 610. In particular, this suggestion of criteria 620 for a new objective 610 can be based on predefined models or "frames" that link types of jobs 610 with typical sets of skills 620 and minimum values for the jobs. These types of frames are described in further detail below.

As shown in FIG. 6, the criteria data 186 also links individual skills 620 (and sub-skills 622) to prompts 300 (and sub-prompts 302) in a many-to-many relationship. This link indicates that a particular prompt 300 (an instruction, question, or request of individual 20) is designed to elicit information or data from the individual concerning that skill 620. For example, if the skill 620 associated with an objective 610 were defined as five years of experience as a registered nurse, the prompt 300 could be a simple question "Are you a registered nurse? If so, talk about why you decided to become a registered nurse and let us know the number of years of experience you have as a registered nurse." This prompt 300 can be refined over time to elicit both the factual data associated with the skill 620 (are they a registered nurse and the number of years of experience they have) and a more open ended request to reveal more about the individual ("talk about why you decided to become a registered nurse"). As explained above, sub-prompts 302 can be used to request more details or further explanations about a particular topic. Sub-prompts 302 can also be associated with sub-skills 622, so if the system 10 knows that a particular objective 610 is available that requires both a skill 620 and a sub-skill 622, the system 10 will ask both the prompt 300 associated with the skill 620 and the sub-prompt 302 that is associated with the sub-skill 622.

It is to be expected that one prompt 300 might be associated with more than one skill 620, such as where a prompt 300 is designed to elicit information about a variety of skills 620. Similarly, one skill 620 might be associated with multiple prompts 300, where multiple prompts 300 or sub-prompts 302 ask about different aspects of a single skill. This is shown in FIG. 6 through the use of the crow's foot notation connecting skills 620 with prompts 300. This connection between these two data elements 300, 620 is created by the system 10 through a careful selection and wording 624 of the prompts 300. In other words, if the system 10 knows that skill 620 is important to an objective 610, and no prompts 300 are designed to elicit information about that skill 620, a new prompt 300 will be created for that purpose (or an existing prompt 300 will be edited). Thus, it is the explicit process 624 of defining the prompts 300 that ensures that the connection between the prompts 300 and the skills 620 are created. In most cases, the generation of the prompts 300 is created through a manual process by human experts. Although the prompts 300 are created using human intelligence, the entire system 10 and the methods described herein operate based on the established relationships in the data 180 and the novel computerized processes described herein.

Figure 7:
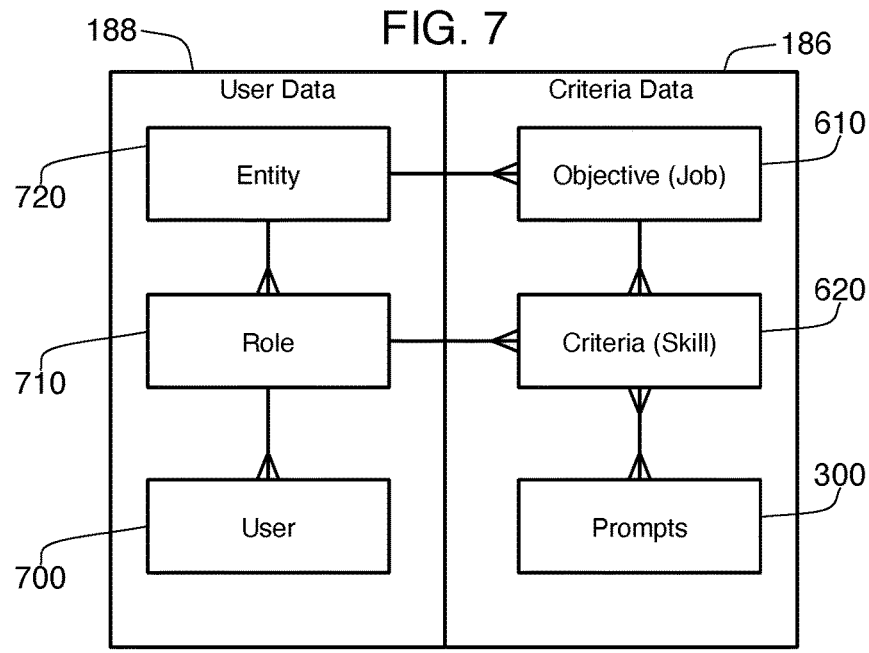
FIG. 7 is a schematic diagram showing the content of user data and the relationships between criteria and user data.

FIG. 7 shows the schematic relationships between data within the user data 188. This figure also shows the relationship between that data 188 and the criteria data 186. The user data 188 maintains data 700 about the individual users of the user computer system 160. This user data 700 may include personally identifiable information (such as their name and contact information) and security information (such as a password) for that user. Each user 700 in data 188 is associated with a role 710. The role 710 is associated with the user's role inside an entity 720. The entity data 720 defines a corporation, company, non-profit entity, or other type of entity that may be responsible for defining the objectives 610 in the system 10. The role data 710 links the user 700 with the entity 720, effectively defining the role of the user 700 in that entity 720. For example, the user data 700 might contain information about Mary Jones. Ms. Jones is a hiring manager at Mercy Hospital. Thus, Ms. Jones's user database entry 700 will be linked to a role database entry 710 that defines a hiring manager, which is linked to an entity database entry 720 for Mercy Hospital. In FIG. 7, it is the entity database entry 720 that is directly linked to the objective or job 610, which indicates that the objective 610 is being provided by that entity. FIG. 7 continues to show that the objective 610 is linked to a plurality of skills 620, and each skill is associated with one or more prompts 300. FIG. 7 also shows that the role 710 is also associated with a plurality of skills 620. This link between roles 710 and skills 620 provides one of the more powerful techniques that system 10 has of customizing presentations, as is explained below.

Linking of Data

As explained above, historical data 190 can store predefined frames that link an objective or job 610 with a plurality of skills 620. One such frame is frame 800 shown in FIG. 8. Frame 800 represents one type of job 610 that is specific for a type of entity 720. In particular, this frame 800 represents an emergency room nurse objective 820 for a hospital type entity 810. When a new user uses the system 10, the user can associate their company or entity with a hospital type entity, thus immediately making available frames (such as frame 800) that are pre-established in the historical data 190.

Figure 8:
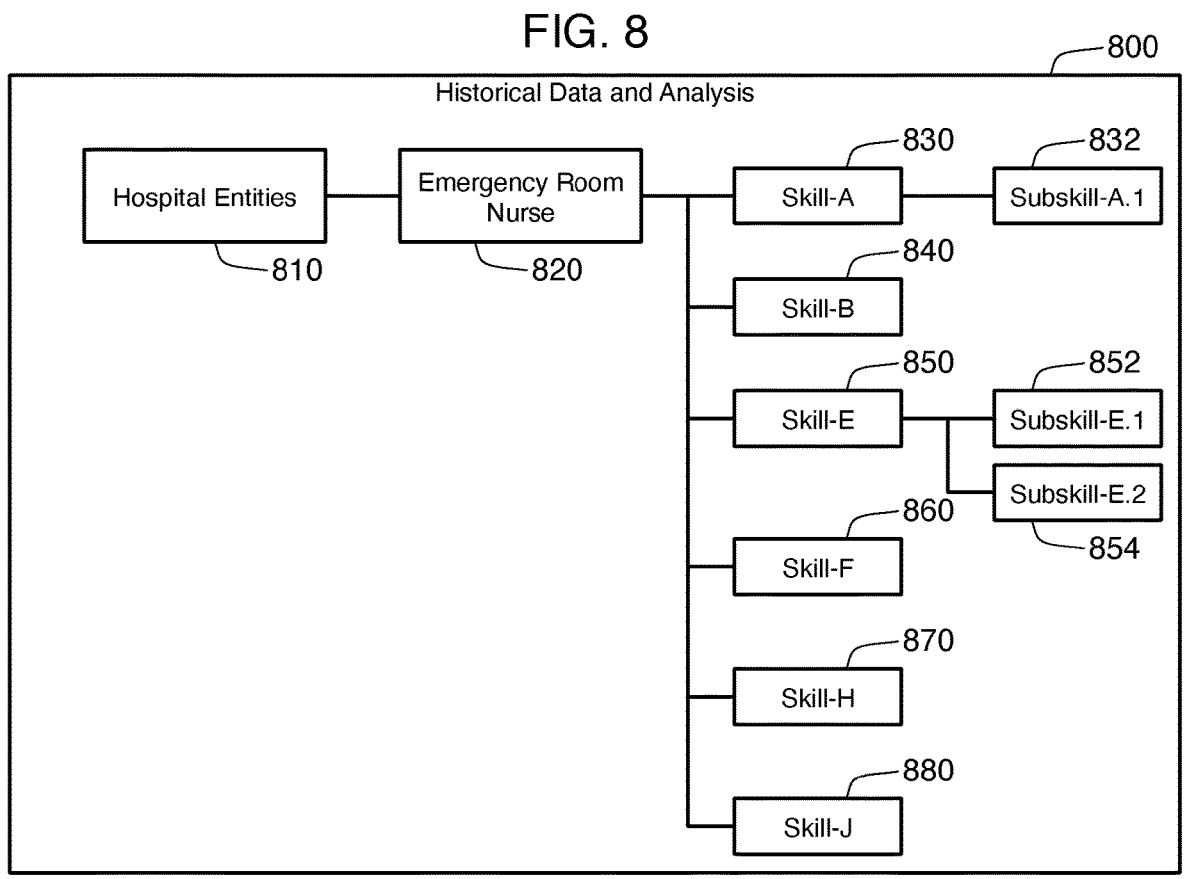
FIG. 8 is a schematic diagram showing the content of example historical data.

This frame 800 is based on an analysis of government data 612 and/or an internal analysis of historical data 190 where other hospitals 810 have specified the skills 620 necessary for this type of job 820. As shown in FIG. 8, frame 800 creates an association between the emergency room nursing job 820 and a plurality of specific skills 830-880 that an applicant would need to possess to be a good candidate for this type of job. To simplify this discussion, the skills are identified by letter. As shown in the figure, the job of an emergency room nurse requires skill-A 830, skill-B 840, skill-E 850, skill-F 860, skill-H 870, and skill-J 880. Skills with letters not listed (such as skill-C and skill-D) are pre-defined in the criteria data 186, but they are not skills 620 typically required for this job 820. Skill-A 830 may be an important skill 620 for this job 820, and (as shown in FIG. 8) also requires a particular specialty or sub-skill 622, namely Sub-skill-A.1 832. In addition, skill-E 850 might require two sub-skills 622, namely Sub-skill-E.1 852 and Sub-skill-E.2 854.

Because this information can be pre-defined in frame 800, if a user from Mercy Hospital elects to create a new objective 610 for an emergency room nurse, the pre-associated skills 830-880 will be automatically presented to the user so that they will not have to manually define the relationship between their objective 610 and the pre-defined skills 620 in the system 10. It is important to remember that frames such as frame 800 simplify the process of establishing the necessary skills 620 for a newly created objective 610, but they do not limit the definition of that objective 610. A user creating the new objective 610 can identify an appropriate frame, such as frame 800, but is then free to edit and modify the identified skills 620 in order to make the database definition of their objective 610 meet their real-world needs.

Figure 9:
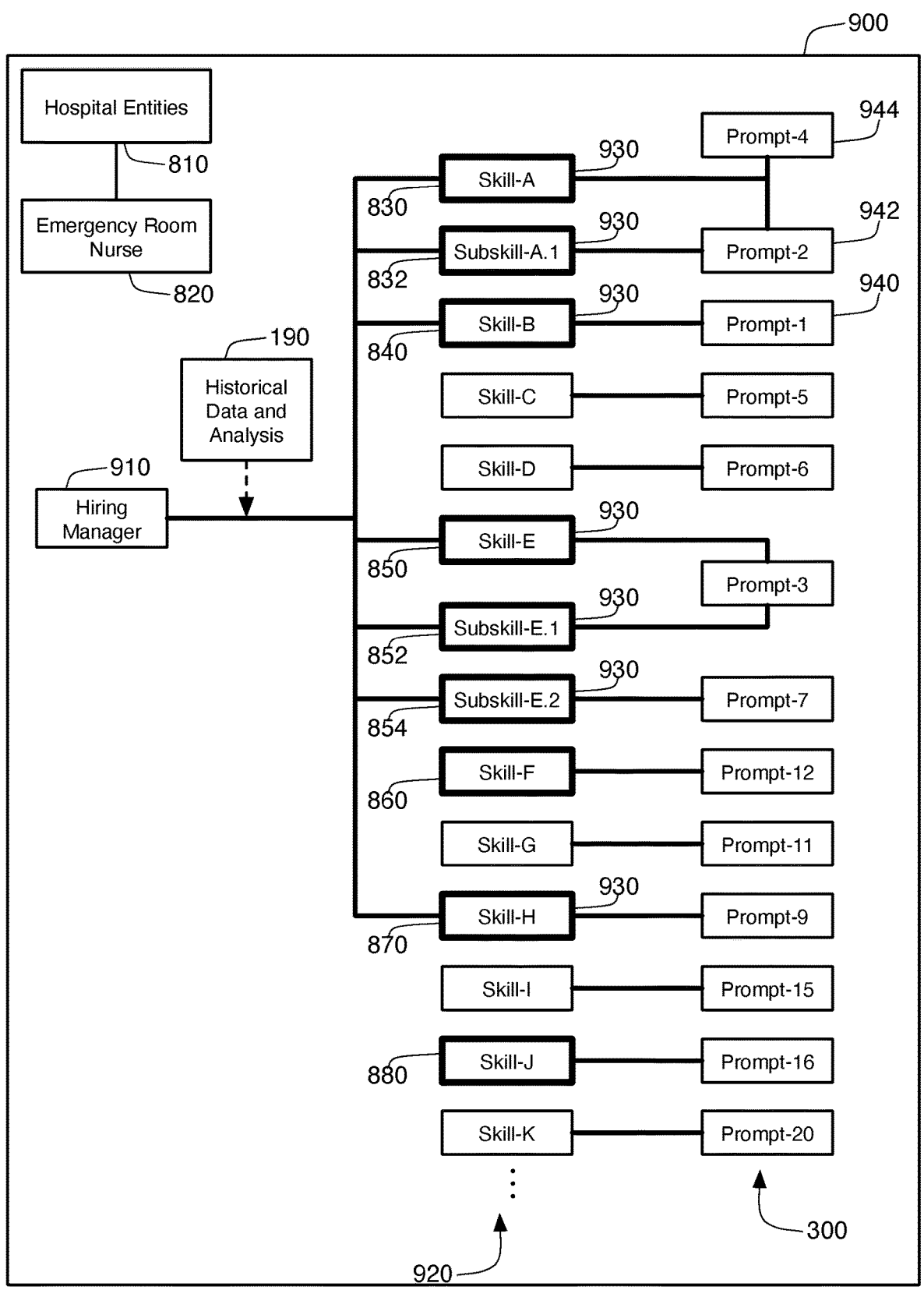
FIG. 9 is a schematic diagram showing the content of example criteria data related to user data.

FIG. 9 shows another frame 900 that links a particular role 710 with a subset of the skills 620 that are associated with an objective 610. This frame 900 is important because the system 10 uses frames like this in order to perform the automatic versions 30 shown in FIG. 1. The importance of this frame 900 becomes clear upon reflection on the fact that most recording sessions of individuals 20 contain a great deal of audio and visual material. If a hiring manager at a hospital was looking to hire a candidate for a particular objective 610, that user may need to review the audio and visual data created during a great number of booth sessions by different individuals 20. While this system 10 is designed to guide the individual 20 using the booth 100 with only relevant prompts 300, some of the information acquired about that individual 20 will not be of particular interest to a hiring manager. However, some of the material that is of little interest to the hiring manager would be of significantly more interest to a co-worker who was participating in the hiring decision. The co-worker may be very interested in the friendliness of the individual and their ability to share responsibilities with others, while these particular traits or skills 620 would be of less interest to a hiring manager that must narrow down a pool of applicants from dozens or hundreds to a much smaller number of final candidates. In other words, while certain skills 620 may be of relevance to all individuals 20 applying for an objective 610, not every skill 620 will be of interest to every user that reviews the recorded sessions of those individuals 20.

Frame 900 again shows the skills 830-880 that have been identified as relevant in the context of an emergency room nurse objective 820 for a hospital type entity 810. This context is explicitly shown in FIG. 9 by the listing of this entity 810 and objective 820 in the upper left of the frame 900. FIG. 9 also includes a list 920 of all skills 620 established in the system 10, including non-relevant skills 620 that are not associated with objective 820 in frame 800. The purpose of this list 920 is primarily to help in the description of the present invention, and those non-relevant skills are presented merely to provide context to the more relevant skills 830-880 that were identified in frame 800. FIG. 9 surrounded these skills 830-880 that are relevant in list 920 by a heavy, bolded border. Thus, skills in list 920 with a thin border were not considered relevant to objective 820 by frame 800.

This frame 900 is established for one particular role 710, in this case the hiring manager role 910. The frame 900 directly links this role 910 to a subset 930 of the skills 830-880 associated with the objective 820. According to this frame 900, users of the hiring manager role 910 are mostly interested in skill-A 830, skill-A.1 832, skill-B 840, skill-E 850, skill-E.1 852, skill-E.2 854, and skill-H 870. These skills 830, 832, 840, 850, 852, 854, and 860 are also identified in FIG. 9 as subset 930. This means that hiring managers would generally prefer to learn more about these skills in subset 930 when reviewing recorded sessions for individuals 20 interested in an emergency room nurse objective 820. This subset 930 does not include all of the skills 620 defined in the system (set 920) nor does it include all of the skills 830-880 defined in frame 800 as being relevant to the specific objective 820 (it does not include skill-F 860 or skill-J 880). Rather, it includes only those skills 930 from the latter set 830-880 that are of particular interest to that role 910.

The right-most column in the frame 900 identifies the prompts 300 that are associated with the skills 620 in list 920. As explained above in connection with FIGS. 6 and 7, each skill 620 is associated with one or more prompts 300 that help elicit information from an individual 20 concerning that skill 620. As can be seen from frame 900, each skill 620 in list 920 is associated with at least one prompt 300. For instance, skill-B 840 is associated in a one-to-one manner with prompt-1 940. This means that prompt-1 940, when provided to individual 20, should create audio and visual data relevant to determining the level of skill-B 840 for that individual 20. Prompt-2 942 is associated with both skill-A 830 and sub-skill-A.1 832, meaning that this prompt-2 942 should gather information relevant to both of these skills 830, 832. Information about skill-A 830 is also gathered by another prompt 300, namely prompt-4 944.

Method for Linking Criteria Data and User Data

Figure 10:
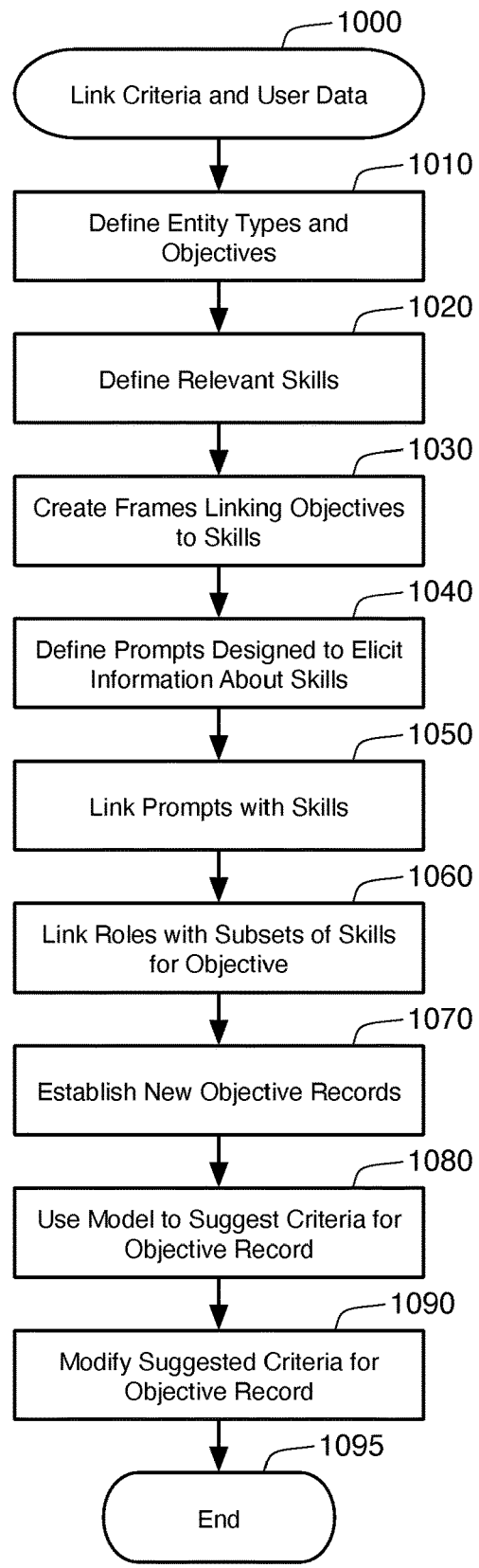
FIG. 10 is a flow chart showing a process of linking criteria and user data using historical data.

FIG. 10 contains a flowchart describing a process 1000 for linking criteria data 186 together and with user data 188. This method 1000 is designed to create frames such as frame 800 and frame 900, and then use those frames 800, 900 when a new user wishes to create a new objective 610 (a new emergency room nurse job opening). At step 1010, the system 10 identifies which entity types 720 and objectives 610 are appropriate candidates for frames like frame 800. If the system 10 has many hospital customers, then identifying objectives relevant for those types of entities would be important. If the system 10 is used by other employer types, identifying objectives for those types would be necessary in step 1010. Furthermore, if the system 10 were used for purposes other than employment and recruiting, such as for musician auditions, the entity types and objectives identified in step 1010 would be related to those types of customers. This step 1010 can be performed manually by researching entity types 720 and objectives 610 by using available resources, such as government data 612. Alternatively, the system 10 can increase its knowledge of entity types and frame objectives by analyzing its own historical data 190 based on entries previously input by prior users or by experts. By researching potential entity customers of the system 10, their objectives (jobs), and their user roles, experts may develop additions to the historical data 190 designed to facilitate the easy use of the system by these types of entities.

At step 1020, the system 10 must established skills 620 that are relevant to the entity types and frame objectives created in step 1010. Once again, the information needed to establish these records can be found in government data 612 or historical information 190 already held by the system 10.

At step 1030, information known about frame objectives and skills 620 are used to create frames such as frame 800. These frames link an objective such as emergency room nurse 820 for a particular type of entity (hospital entity 810) with a set of defined skills 620 (such as skills 830-880). This is described in more detail above in connection with FIG. 8.

At step 1040, prompts 300 are created with the specific intent of eliciting information from individuals 20 concerning the skills 620 established in step 1030. In most cases, these prompts 300 will be carefully crafted and then specifically link with one or more skills 620 in step 1050. This is seen in FIG. 9.

At step 1060, the system 10 will associate a role 710 with a subset of the skills 620 linked to each objective in the frames defined in step 1030. FIG. 9 shows that a particular role, such as the hiring manager role 910, is associated with only a subset 930 of skills that are associated with the frame objective 820. The selection of this subset 930 can occur in a variety of ways. One technique is to simply ask a plurality of users having that role what is of interest to them. Users can also be asked to prioritize the skills associated with the objective 820, and higher-priority skills can be selected as the subset 930. Alternatively, experts can select this subset 930 based on their knowledge of the industry. A further technique is described below in connection with FIGS. 11 and 12, in which users having particular roles 710 are monitored in their use of the system 10.

At step 1070, a user computer system 160 requests that the system server 170 establishes an objective or job record 610 within the criteria data 186. Before this is possible, the user must be logged into the system server 170, such as by providing a user identifier and password. This associates the user with a user record 700 in the user data 188, which in turn is associated with a role 710 and an entity 720. Because of this, the system server 170 will have knowledge about the user's entity 720 and will be able to suggest pre-defined objectives or jobs for that entity 720 during the process of creating the new objective record 610. Even if the pre-defined objective is not a perfect fit for the current objective 610, the user can be encouraged to identify the closest fit.

In the next step 1080, the system server 170 utilizes its best available frame, such as frame 800, to suggest criteria or skills 620 for the newly entered objective record 610. For example, if the user defined a new emergency room nurse job opening in a hospital setting, frame 800 would be utilized to suggest that skills 830-880 be assigned to this new objective 610. In the following step 1090, the system server 170 will present the suggested skills 620 to the user for editing and modification. In many circumstances, no changes will be necessary. However, each objective 610 may be unique, and thus the user creating the objective may refine the skills 620 and the level (such as experience level) associated with the skills 620 as necessary. This method would then end at step 1095.

The above-described method 1000 assumes the automatic or expert creation of frame 800 and frame 900. In other embodiments, entities (customers) can customer define the frames 800, 900 for themselves, so that each user 700 associated with that entity 720 of a particular role 710 will use the frame 800, 900 explicitly defined by that customer. Different customers can establish frames 800, 900 and even different roles 710. In the creation of these frames 800, 900, the customer would of course be able to start with the automatically or expertly created frame 800, 900 of the type described above, and then modify them as desired.

Furthermore, it is to be expected that separate frames 800, 900 will be created for separate industries, such as frames specific to medical recruitment. In this way, entities could have a turn-key experience based on recruiting and hiring best practices in their industry without requiring extensive customization and set-up. Roles 710 within the industry could be preconfigured to use a specific set of frames 800, 900 while still being customizable.

Monitoring Use by Role

In FIG. 11, a role monitoring system 1100 is presented in which a user system 1110 accesses a system server 1130 over a network 1120. This role monitoring system 1100 is similar to the system 10 shown in FIG. 1, and in fact system 10 can be used in place of system 1100 for the purpose of role monitoring. However, not all of the elements of system 10 are required in system 1100.

The user system 1110 is operated by a user having a known role 710 at an entity 720. In this system 1100, the user is allowed to select the audio and visual segments (or video segments) recorded of multiple individuals 20 in the booth 100. As explained above, the individuals 20 response to prompts 300, and the audio and visual recordings are divided into video segments according to the prompt segments 306. In this context of system 1100, it is not necessary to further divide these audio and visual segments into further time segments 310 that are of a shorter duration than the prompt segments 306, but that is possible.

In order to evaluate the multiple individuals 20 that have recorded sessions in the booth 100, the user will need to compare the individual 20 against the skills 620 that are relevant to an open objective 610 at the user's entity. In this case, rather than the system 1100 creating a customized version 30 of the recorded session just for that user, the user of system 1110 is given freedom to select a particular prompt 300 and then watch the video segment(s) for an individual 20 for the prompt segment associated with the selected prompt 300.

In a first embodiment, the system server 1130 will allow selection of only those particular prompt segments 306 that may be of interest to this user, such as the set of prompts segments 1140 shown in FIG. 11. These prompt segments 1140 (for prompt-1, prompt-2, prompt-3, prompt-4, prompt-7, and prompt-9) may be those segments for prompts 300 that the system 1110 preselects as relevant to the user of user system 1110 based on the role 710 assigned to that user. Note that these are the very prompts segments 1140 that frame 900 would identify as eliciting information relevant to the subset of skills 930 of interest to the hiring manager role 910 for the job of an emergency room nurse 820. In a second embodiment, the system server 1130 allows the user system 1110 to select video segments from any prompt 300 provided to the users 20.

The system 1100 is designed to monitor the interaction between the user system 1110 and the system server 1130. In particular, the users are monitored to determine which of the prompt segments 1140 are selected by the user for review, and in what order. FIG. 12 shows a table 1200 that presents this data. Six separate users 1210 are shown in this table 1200, with each user 1210 in his or her own row. Each column 1220 indicates which prompt segment 1140 was selected in which chronological order. For instance, the first row represents the selection of user 1. User 1 first selected the video segment(s) related to prompt-3, then prompt-2, then prompt-4, then prompt-9, then prompt-1, and then prompt-7. This user 1 has likely reviewed the video material for numerous individuals 20 interested in this objective 610. Thus, the user knows which prompts 300 are most likely to elicit information that is relevant to that user's analysis of this individual 20. Rather than going chronologically through the video segments, the user wants to see the individual's response to prompt 3 first, then 2, 4, 9, 1, and 7. The second user also preferred to view prompts 3 and 2 first, but the second user reversed the order of these prompts, selecting first prompt 2, then 3, 1, 4, 7, and 9. This table 1200 contains data from analyzing six different users 1210. Each user row 1210 might represent a single use of system 1100 by a user, meaning that a user that uses the system 1100 to review multiple individuals will create multiple rows 1210 in table 1200. In other embodiments, each user is associated with only a single row 1210, with the data in a row 1210 representing the user's typical or average ordering of prompts.

The bottom row 1230 in table 1200 represents aggregate ranking for the ordering. In this case, the aggregate ranking is the selection of the mode for each ordering, although each prompt can appear only one time in the mode row 1230. For the first position, the second prompt was selected by three of the six users 1210, which resulted in the mode row 1230 identifying the second prompt in the 1st column 1220. Four users selected the third prompt in the second column 1220, so the mode row 1230 identifies the third prompt in the second column 1220. The mode row is designed to select the best overall ordering of prompts 1140 based on watching the interaction of multiple users using system 1100. The actual mathematics to generate the mode row 1230 are relatively unimportant, as long as the table 1200 generates an ordering of the prompts based on the "herd mentality" of the observed users. For example, each prompt 300 could simply be assigned an average rank based upon the table 1200, with the ordering of prompts 300 being based on the ordering of their average rank. In the preferred embodiment, a different table 1200 is created for each role 710. Thus, a separate ranking is created, for instance, for hiring managers when compared to co-workers when searching for an emergency room nurse at a hospital.

In some embodiments, the list of prompt segments 1140 provided by system server 1130 is not restricted based upon the role 710 of the user 700. Rather, the user is allowed to select video material from any prompt 300. In FIG. 12, table 1200 includes entries for prompt 12 and prompt 16, which were not among the prompts 300 preselected for the hiring manager role 910 in frame 900. By monitoring users with the ability to select any prompt 300, the system 1100 can actually verify the selection of prompts 300 by a frame 900. If prompt 12 (associated with skill-F 860 in frame 900) is routinely selected by hiring managers early in their review of an individual, the frame 900 can be altered to associate skill-F 860 as a skill of interest to hiring managers 910. Alternatively, system 1100 can be used to help create frame 900, with none of the skills 830-880 assigned to the emergency room nurse objective 820 being associated to the hiring manager role 910 until after the generation of table 1200. This table 1200 would therefore show that users of the role of hiring managers are most interested in the prompts 1, 2, 3, 4, 7, and 9, or more specifically the skills 620 associated with these prompts 300, which are skill-A 830, skill-A.1 832, skill-B 840, skill-E 850, skill-E.1 852, skill-E.2 854, and skill-H 870.

Generation of a Custom Version of a Recorded Session for a User

FIG. 13 shows a particular example of actual criteria data 186 and user data 188. In this example, a user record 1300 has been established for Mary Jones. This user record 1300 is associated with the hiring manager role record 1310 for the Mercy Hospital entity 1320. An objective or job 1330 record has been created for Mercy Hospital for an emergency room nurse. Using the frame 800 created as described above, a plurality of skill records 1340, 1342 have been associated with this emergency room nurse job record 1330. In FIG. 13, the skill records are divided into two groups. A first group 1340 is directly associated with the hiring manager role 1310 at Mercy Hospital 1320. These records are the selected skills 930 that frame 900 associates with this role, namely skill-A 830, skill-A.1 832, skill-B 840, skill-E 850, skill-E.1 852, skill-E.2 854, and skill-H 870. The other group of skills 1342 are those skills that are relevant to the emergency room nurse objective record 1330 but are not associated with the hiring manager role 1310. These are skill-F 860 and skill-J 880. In FIG. 13, the prompts 1350 related to these skills 1340 are identified and sorted. In one embodiment, these prompts 1350 are sorted according to the herd mentality scoring of table 1200, created by monitoring other users of the same role interacting with audio visual recordings associated with these prompts 1350. As shown in FIG. 13, these prompts are sorted as follows: 2, 3, 1, 4, 7, 9.

This actual user data 188 and criteria data 186 is then used to create a custom version 30 of a recorded session of individual 20 for Mary Jones. Based on this data 186, 188, prompts 2, 3, 1, 4, 7, and 9 have been identified as prompts of interest for Ms. Jones, and they have been ordered in a manner that should present the most relevant and useful prompt response first. These prompts 300 are then used to identify relevant time segments 310 and the associated audio segments 330, 332 and visual segments 340, 342, 344 for each time segment. These sorted and identified video segments can then be used to create a customized version 30 of the recorded data, as shown in FIG. 14.

In particular, customized version 1400 contains video segments (audio and visual data) for each of the identified prompt segments 1140. The first prompt segment 1410 of the customized version 1400 contains audio 2.2 434 and visual 3.2 436. Audio 2.2 434 is the audio segment for the second prompt (the 2 after the decimal) taken from microphone-2 124 (the 2 before the decimal). Visual 3.2 436 is the visual segment for the second prompt taken from camera-3 116.

The second prompt segment 1420 relates to audio and visual segments for prompt 3. As can be seen in FIG. 14, this segment 1420 includes two time segments 310. Thus, in the middle of presenting the response of individual 20 to prompt 3, the camera will switch from camera-2 114 to camera-3 116, while microphone-2 124 will continue to provide the audio for the entire portion 1420. The third prompt segment 1430 also contains two time segments 310, meaning that the camera will switch from camera-2 114 to camera-1 112 in the middle of the response to this prompt 300, while audio switches from microphone-2 124 to microphone-1 122. The fourth prompt segment 1440 contains three time segments 310, with the camera switching from camera-2 114 to camera-3 116 to camera-1 112 with the microphone input switching only from microphone-1 122 to microphone-2 124. The fifth prompt segment 1450 contains only a single time segment, while the sixth prompt segment 1460 once again contains three time segments.

This customized version 1400 is created for the recorded session of one individual 20 at the booth 100. Even though the individual 20 may have responded to many more prompts 300 (such as twelve), and even though each camera 110 and each microphone 120 separately recorded visual and audio data, respectively, the version 1400 uses only a small portion of this information to create version 1400 for this user. To do this, the system 10 selects only a subset of the prompts 300 answered by the individual 20 based on their user's role 710, orders the prompt segments 306 for these prompts 300 based on the herd analysis of table 1200, identifies multiple time segments 310 for a plurality of the prompt segments 306, identifies preferred audio and visual sources (aka, the video data) for each time segment 310, and then combines this selected and ordered subset of information into the customized version 1400 of the recorded session.

Figure 15:
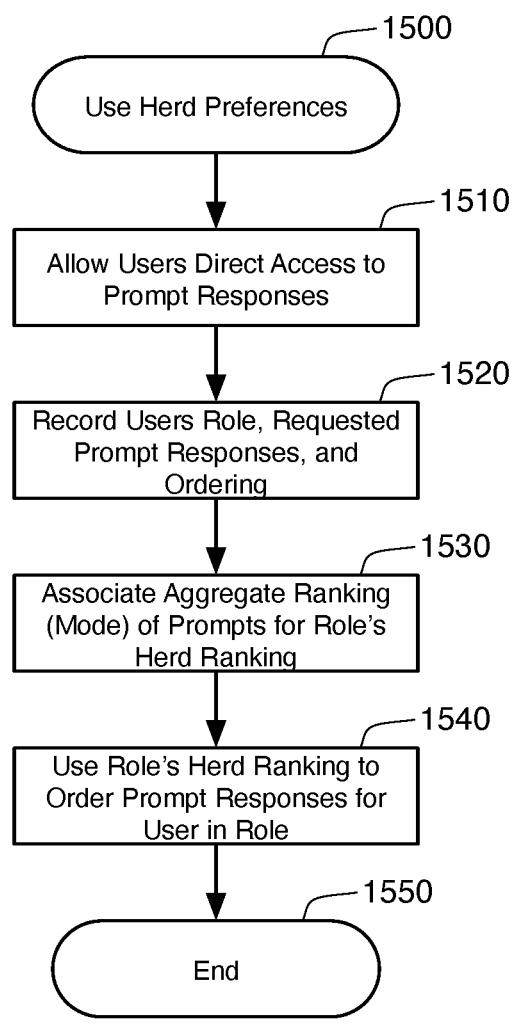
FIG. 15 is a flow chart showing a process of using historical herd data to generate a customized presentation.

FIG. 15 sets forth a method 1500 using herd preferences to order the resulting prompts for a customized version 30 for a user. The method 1500 starts at step 1510, in which system 1100 is created to allow users to have direct access to prompt responses of individuals 20. In this way, as explained above, the users can select which prompt segments 306 they want to observe, and in which order they want to observe them. At step 1520, the system 1100 observes the user, and records their user's use of the system 1100, their selection and ordering of prompt segments 306, and the user's role 710. Based on this observation, it is possible to determining a selection and ranking of prompt segments 306 for a particular role 710 (and for this particular type of objective or job 610 for this entity type 720). This occurs at step 1530. Finally, at step 1540, a new user to the system 10 is associated with a role 710, and the stored selection and ranking of prompt segments 306 from step 1530 is used to order the time segments 310 for this new user (and for a new recorded session for a new individual 20). The method then ends at step 1550.

Monitoring User Behavior

Figure 16:
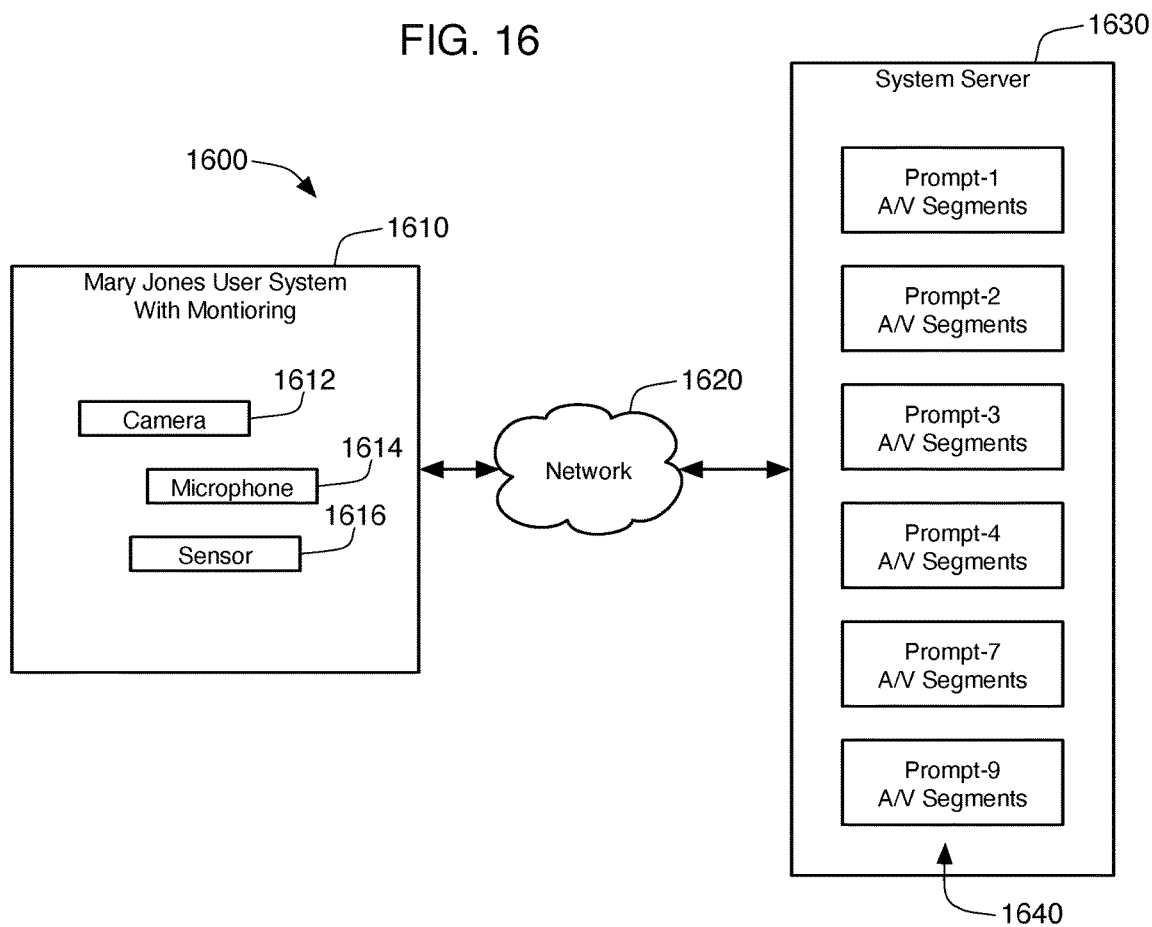
FIG. 16 is a schematic diagram showing a system for monitoring an individual user.

FIG. 16 discloses a user monitoring system 1600 that is very similar to the role monitoring system 1100 of FIG. 11. In the user monitoring system 1600, a user computer system 1610 of one particular user 1610 is monitored as opposed to multiple users of a similar role 710. In this case, the user system 1610 of Mary Jones is being monitored. This system 1610 accesses a system server 1630 over a network 1620. Like the role monitoring system 1100, the user monitoring system 1600 is similar to the system 10 shown in FIG. 1, and in fact system 10 can be used in place of system 1600 for the purpose of user monitoring.

Once again, like the role monitoring system 1100, system 1600 allows the user computer system 1610 to watch prompt segments 1640 associated with a plurality of prompts 300. Unlike the user system 1110 in the role monitoring system 1100 and the user system 160 in system 10, the user monitoring system 1610 has the ability to physically observe the actual user while they review the segments 1640. The user monitoring system 1610 preferably has a visual camera 1612 monitoring the user and may further comprise a microphone 1614 to record audio of the user and a depth sensor 1616 capable of monitoring the physical body movements of the user. In this way, the user system 1610 monitors the user's facial and body reactions when the user is viewing the recorded prompt segment responses. In some embodiments, the user is given access to the booth 100 to observe the audio and visual segments 1640. In this way, booth 100 operates as user system 1610, allowing the cameras 110, microphones 120, and sensors 130 of the booth 100 to monitor the user. In other embodiments, smaller, less intrusive monitoring equipment 1612, 1614, 1616 is provided to users for use at their workstations. In still further embodiments, users give permission for cameras 1612 already present at their workstation (such as video conferencing cameras) to monitor their reactions while viewing the video segments 1640.

Figure 17:
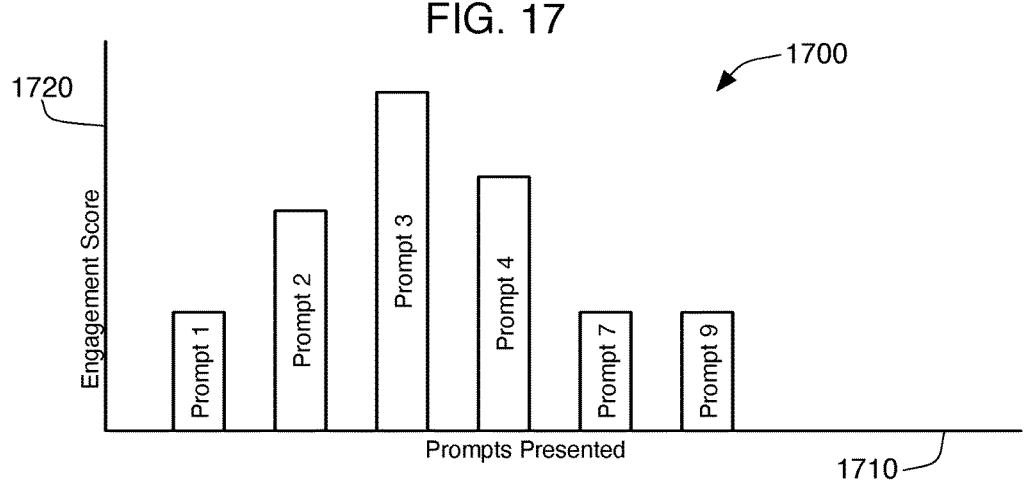
FIG. 17 is a bar graph showing the results of the analysis made using the system of FIG. 16.

In a manner similar to the way that the system 10 develops scores 360 for individuals 20 using the booth 100, the user monitoring system 1600 develops a score for the user viewing the prompt segments 1640. In this case, the score is designed to measure the user's engagement with the segments 1640 being presented. After watching the user view numerous segments 1640 associated with prompts 300, the system 1600 will be able to discern differences in the user's level of engagement with responses to different prompts 300. In FIG. 17, a chart or graph 1700 is shown in which the user's average engagement score 1720 when watching the prompt segments 1640 is compared against the prompts 1710 that prompted each segment 1640. The resulting data 1700 can be used to determine whether or not the user is generally more or less engaged with the responses to particular prompts 1710. As seen in chart 1700, Mary Jones is consistently more engaged with prompt segments 1640 that respond to prompt-3. The second highest level of engagement is with prompt-4, with the third highest level being with prompt-2. Mary has consistently low levels of engagement for segments 1640 associated with prompt-1, prompt-7, and prompt-9.

Figure 18:
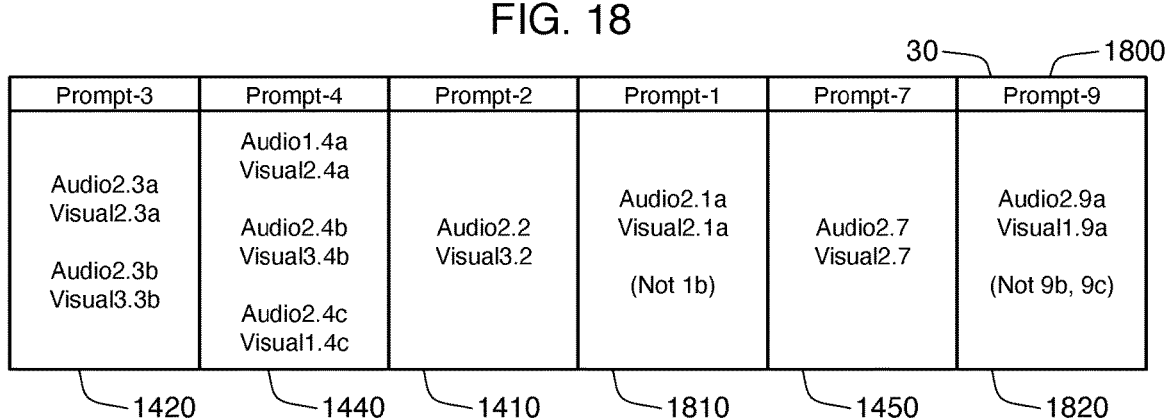
FIG. 18 is a schematic diagram showing audio and visual segments forming a presentation based on the results of the analysis made using the system of FIG. 16.

The information in chart 1700 can be used to re-sort and even edit the prompt segments 1640 included in the custom version 30 presented to Mary Jones in the future. As shown in FIG. 18, Mary Jones will in the future receive a custom presentation 1800 that reorders the prompt segments 1640 according to her known engagement with similar material in the past. First to be presented to Mary is prompt 1420 for prompt-3, which was the second segment presented in version 1400 shown in FIG. 14. This segment 1420 is presented first to Ms. Jones because she was found to have a higher engagement score with responses to prompt-3 in chart 1700 than any other prompt 300. Consequently, the custom version 1800 presents this material first. The second segment to be presented belongs to the fourth segment 1440 of the version 1400 relating to prompt-4, while the third segment of version 1800 is the first segment 1410 relating to prompt-2. This reordering is again a direct result of the monitoring of Mary Jones's interaction with responses to these prompts 300.

The last three segments in version 1800 are for prompt-1, prompt-7, and prompt-9. Mary Jones did not have a high engagement score 1720 for these prompts 300, so they are presented last in custom version 1800. Furthermore, because of this low engagement score 1720, the audio and visual segments associated with prompt-1 and prompt-8 have been edited. Segment 1810 is associated with prompt-1, but it does not contain any material from time segment 1b 422. In other words, audio1.1b segment 424 and visual1.1b segment 426 are not included in segment 1810. The system 10 decided that the low engagement score 1720 by Mary Jones for prompt-1 indicated that not all of the time segments 310 for this prompt 300 should be included in the custom version 1800. The system 10 had to select which time segment 310 to remove, namely time segment 1a 412 or time segment 1b 422. A variety of rules can be utilized to make this selection. In one embodiment, the first time segment 310 for a prompt 300 is always included, but remaining time segments 310 are excluded. In other embodiments, the scores 360 associated with each time segment 310 are compared, with only the highest scoring time segment 310 being included. As shown in FIG. 4, the overall scores 418 for time segment 1a 412 are slightly higher than the scores 428 for time segment 1b, so time segment 1b is removed.

Similarly, the last segment 1820 related to prompt-9 is also edited. In version 1400, all three time segments 310 for prompt-9 were presented. In version 1800, only video for the first time segment (9a) is included, with time segments 9b and 9c being removed from the presentation 1800.

Figure 19:
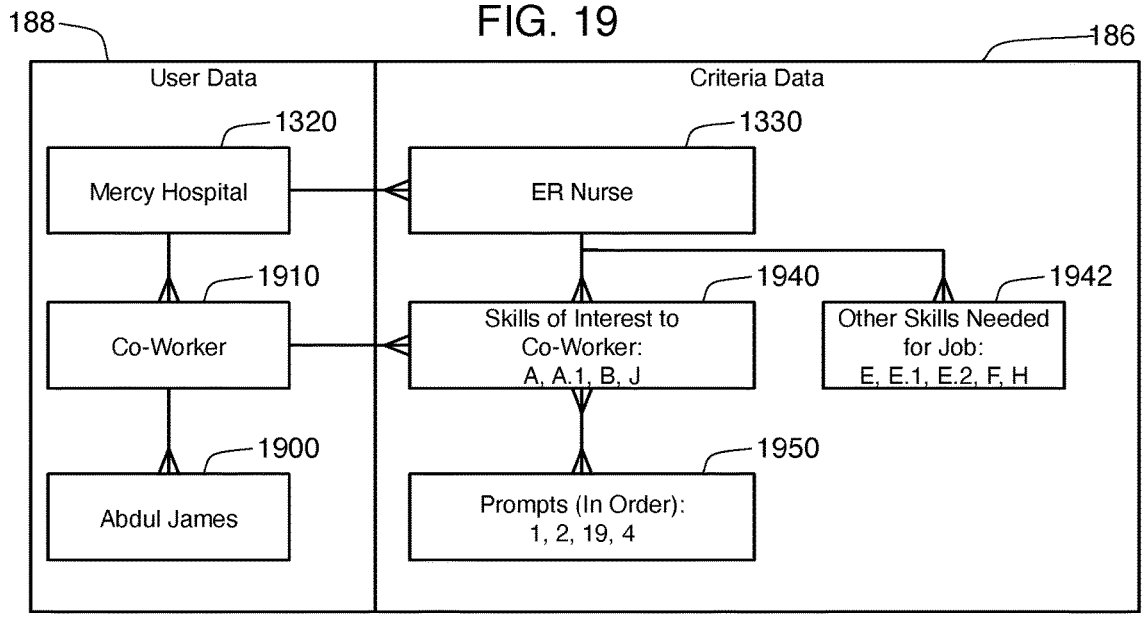
FIG. 19 is a schematic diagram showing the content of example criteria and user data generating ordered set of prompts for use in a presentation for an alternative user.

FIG. 19 shows actual data criteria data 186 and user data 188 similar to that presented in FIG. 13. This data is still concerned with the emergency room nurse objective 1330 of Mercy Hospital 1320. In this case, however, a different user 1900 having a different role 1910 is desiring to view recorded session data from booth 100. The record for Abdul James 1900 indicates that Mr. James will be a co-worker (role 1910) to any emergency room nurse hired to fill objective 1330. As explained above in connection with FIGS. 9 and 10, a subset 930 of criteria 620 associated with the objective 610 is associated with each role 710. Thus, the subset of associated criteria 1940 for the co-worker role 1910 is different than the subset of associated criteria 1340 shown in FIG. 13 for the hiring manager role 1310. The subset of associated criteria 1940 for co-workers 1910 includes skill-A 830, skill-A.1 832, skill-B 840, and skill-J. The other skills 1942 are still associated with the job of emergency room nurse 1330, but those skills 1942 are considered to be of lesser interest to co-worker role 1910 than the identified skills 1940. Using the herd analysis of FIGS. 11 and 12 for co-worker role 1910, an ordering of the skills 620 and related prompts 300 can be determined for use in creating a customized version 30 for co-workers. The prompts 1950 for skills 1940 are selected by a frame such as frame 900 (but for co-workers), and are sorted in FIG. 19 by the herd analysis into the order of prompt-1, prompt-2, prompt-19, and prompt-4.

Figure 20:
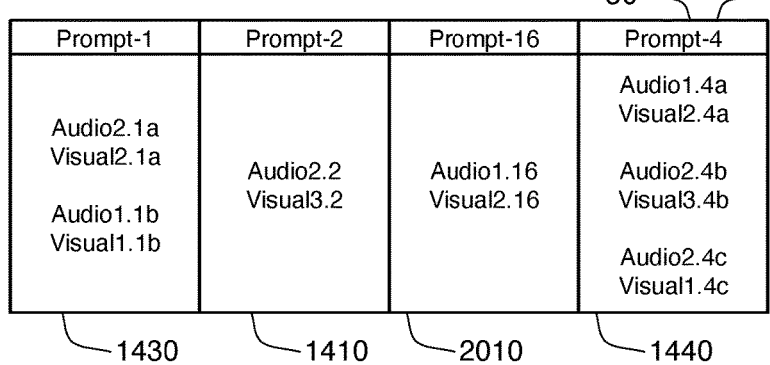
FIG. 20 is a schematic diagram showing audio and visual segments forming a presentation for the alternative user of FIG. 19.

This ordering of prompts 1950 leads to the creation of customized version 2000 shown in FIG. 20. In this version 2000, prompt segment 1430 for prompt-1 is presented first, followed by segment 1410 for prompt-2. Prompt-19 results in segment 2010, followed by segment 1440. Note that even though segment 1440 was presented last in this version 2000, all time segments 310 associated with prompt-4 were included. In another embodiments, the last prompt segment or segments could be automatically edited down to exclude lesser scored time segments 310 associated with a prompt 300, especially when a large number of time segments 310 have been identified for a single prompt segment.

Figure 21:
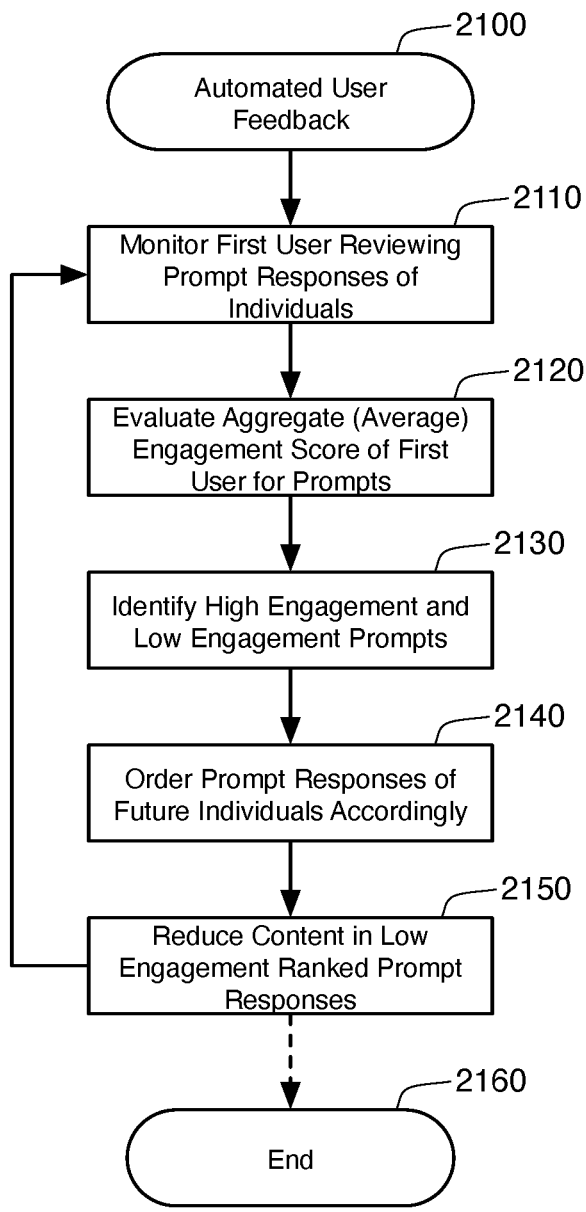
FIG. 21 is a flow chart showing a process of monitoring an individual user to customize a presentation to that user.

FIG. 21 presents a process 2100 for monitoring a user of a user computer system 1610 in order to alter future custom versions 30 for that version. The user is monitored at step 2110 using system 1600, with an engagement score being created for each review of one or more video segments associated with a prompt 300. At step 2120, an aggregate engagement score 1720 is determined for the user for each applicable prompt 300. The applicable prompts 300 may be those prompts chosen for this user based on the methods described above. Alternatively, the user would be able to review responses to all prompts using system 1600. Although the aggregate score can be calculated in a variety of manners, a simple average for each prompt should be sufficient.

At step 2130, prompts 300 are identified that generated higher than average engagement scores 1720 and lower than average engagement scores 1720. In one embodiment, engagement scores 1720 can be divided into three tiers: much higher than typical, typical, and much lower than typical. The typical engagement score might be the average score 1720 for the user across all prompts. The engagement scores 1720 are then used at step 2140 to order prompt segments 306 for a customized presentation 30 in the future. Higher than typical scores 1720 can be used to move segments associated with those prompts to the beginning of the customized presentation 30. Lower than typical scores 1720 can move associated segments to the end of the presentation 30. Scores in the range of typical can remain in the normal sorted order, such as the order created by the herd analysis of FIGS. 11 and 12.

In some embodiments, step 2150 will reduce the amount of content associated with lower than typical engagement scores 1720. As explained above, this can involve removing time segments 310 when multiple time segments 310 are associated with a single prompt segment. The selection of time segments 310 to remove can be based on their chronological order, or the scores 360 generated for each segment.

The method 2100 can be continuous, meaning that step 2110 will follow step 2150, allowing the system 1600 to continue its monitoring of the user so as to continuously improve the customized version 30 created. Alternatively, the method 2100 can end at step 2160 at the conclusion of step 2150.

The above method 2100 was described in connection with analyzing an engagement score 1720 of the user. While the incorporated applications describe different methods for calculating different scores of monitored individual, it is not necessary that any of these exact scoring techniques be used in this context. Other scoring techniques related to visual or body monitoring can be used. In addition, while some techniques may refer to monitoring "engagement," other monitoring scores can also be applicable. For instance, rather than monitoring the engagement of a user, one might monitor the "interest" of a user, or the "emotional connection" of the user, or the "attentiveness" of the user, or even the "concentration" of the user. Any scoring technique that generally predicts that a user finds responses to particular prompts 300 more useful can be utilized.

Use of Behavioral Data

Figure 22:
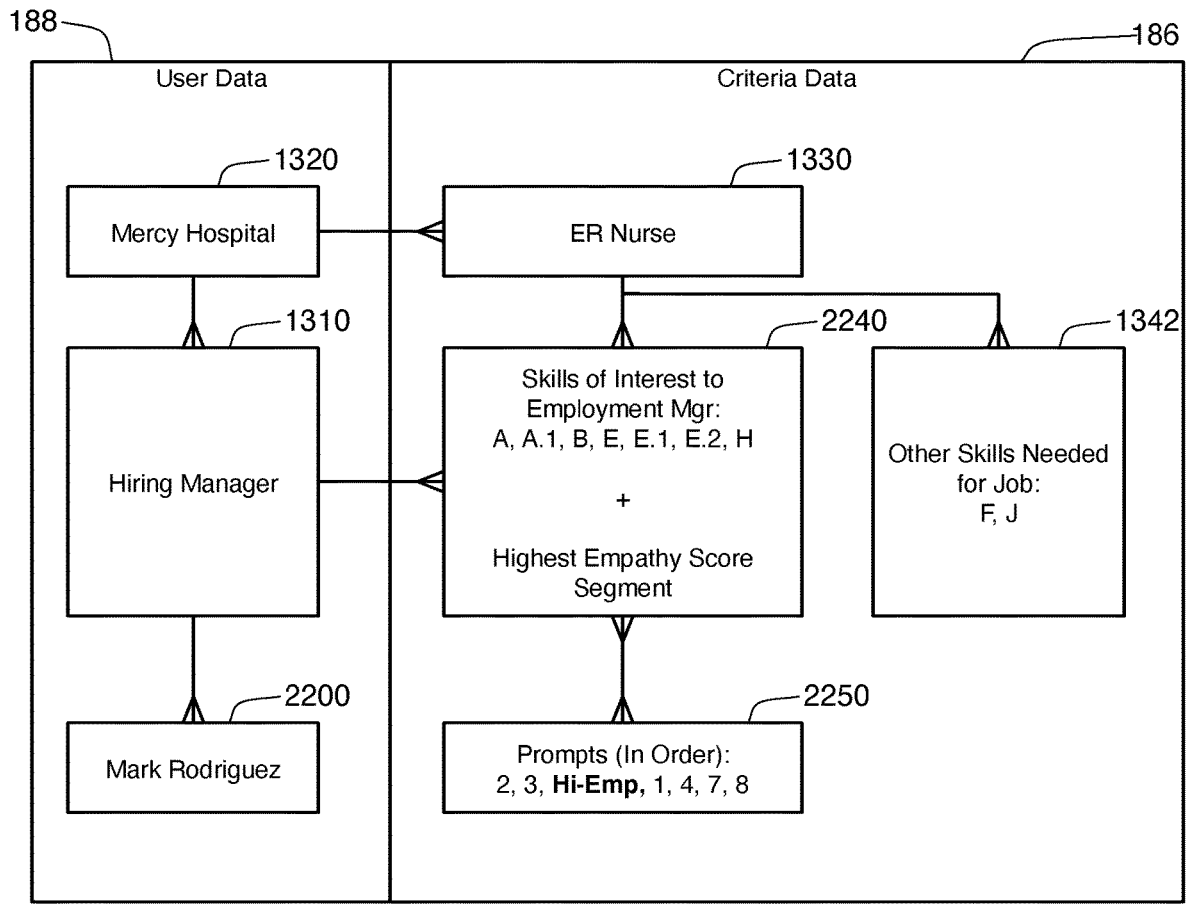
FIG. 22 is a schematic diagram showing the content of example criteria and user data generating an ordered set of prompts in another embodiment.

FIG. 22 shows another example of criteria data 186 and user data 188 being used to create a custom presentation 30. This data 186, 188 is very similar to the data shown in FIG. 13, in that it relates to the hiring manager role 1310 at Mercy Hospital 1320, in the context of an emergency room nurse objective 1330. In this case, the user 700 is Mark Rodriguez 2200. Mr. Rodriguez is also a hiring manager 1310, so frame 900 will automatically associate him at box 2240 with the subset of skills 930 associated with the hiring manager role, as shown in FIG. 9. The other skills needed 1342 for the emergency room nursing job 1330 remain the same, namely skill-F 860 and skill-J 880.

The skills of interest to the hiring manager 2240 shown in FIG. 22 contains the same skills of interest to the hiring manager 1310 shown in FIG. 13, with the addition of the "highest empathy score segment." This addition can be the result of a customization made by Mr. Rodriguez to the automatically created version 30 provided by the system 10. With this alteration, the system 10 will analyze the video segments of an individual to look for the segment that scored the highest on the empathy score. That segment will then be included in the created version 30 for Mr. Rodriguez. The user may have made this customization because he is particular concerned about the empathy of the individuals 20 applying for this job 1330.

The prompts 2250 that are used to generate the custom version 30 of the presentation are shown to include the Hi-Emp prompt. In addition to this Hi-Emp prompt, the prompts 2250 include prompt-2, prompt-3, prompt-1, prompt-4, prompt-7, and prompt-8. These prompts are sorted according to the herd analysis of FIGS. 11 and 12, with the Hi-Emp video segment inserted into the third position.

As explained above, the response to a single prompt 300 may be subdivided into separate time segments 310 by finding switching events inside the time segment 310 for the prompt 300. In these contexts, each of these subdivided time segments 310 might be separately scored and identified, with the Hi-Emp portion of the created presentation 30 being limited to single, high scoring time segment 310 as opposed to an entire response to a prompt 300. Alternatively, all time segments 310 that relate to a single prompt segment are grouped together and given a single score for this analysis, and then the highest ranking response to a prompt 300 is presented in its entirety.

The empathy score 360 is just one example of a score that can be used to alter to customized version 30. In some contexts, a user 700 may be interested in seeing the individual at their most comfortable. Data from the behavioral sensors 130 can be analyzed over the course of a recording session to analyze which time segments 310 represent the individual at their most confident and relaxed. Other users 700 may be most interested in the time segments 310 that have the highest technical score 360, or the highest engagement score 360.

Still other embodiments utilize the highest score test to select prompts segments for a version 30 as part of the framework for a role. For instance, framework 900 could be altered for all hiring managers to automatically include the segment with the highest empathy score. By including this in the framework 900, hiring manager Mary Jones 1300 (and all other hiring managers 1310) will have the highest empathy scoring segment in the version 1400 created for her.

In some instances, the highest empathy scoring segment will already be included in the version 30 created using the data of FIG. 22. In that case, either the next-highest scoring segment is added instead, or the customized version 30 doesn't include any "Hi-Emp" segment since the highest scoring segment is already included.

Figure 23:
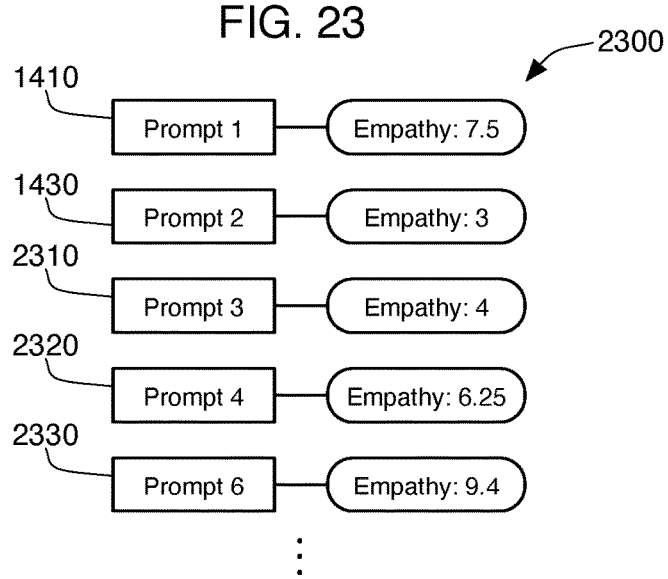
FIG. 23 is a schematic diagram showing empathy scores associated with a variety of prompts.

Some embodiments will not include a highest scoring segment in the prompt list 2250 unless the score 360 of that highest scoring segment is significantly higher than any of the already included segments. For example, assume that the recorded segments have the empathy scores shown in the partial list 2300 of FIG. 23. Prompt-1 1410 has an empathy score of 7.5 (the average of time segment 1a 412 and 1b 422). Prompt-2 1430 has an empathy score of 3, while prompt-3 2310 has a score of 4, prompt-4 2320 has a score of 6.25, and prompt-6 has a score of 9.4. The relevant frame (such as frame 900) or customization may require that the highest empathy segment must have a score of at least 20% greater than any other displayed segment before it is added to the prompts 2250 used to create the customized version 30. In this case, the highest scoring segment that will be included without this analysis is the prompt segment for prompt-1 1410, which has an empathy score of 7.5. If the 20% standard is used, the highest empathy scoring segment will be included only if the empathy score for that segment is at least 9.0 (20% more than the 7.5 score of prompt-1 1410). In this case, prompt-6 2330 meets this standard, so the video segments associated with prompt-6 2330 will be added to the prompts 2250. Of course, this analysis is always performed on the recorded data for one particular individual 20. While prompt-6 2330 is included for a first individual 20, the second individual 20 is unlikely to receive the same scores as shown in list 2300, so the analysis must be re-performed for the second individual 20.

Figure 24:
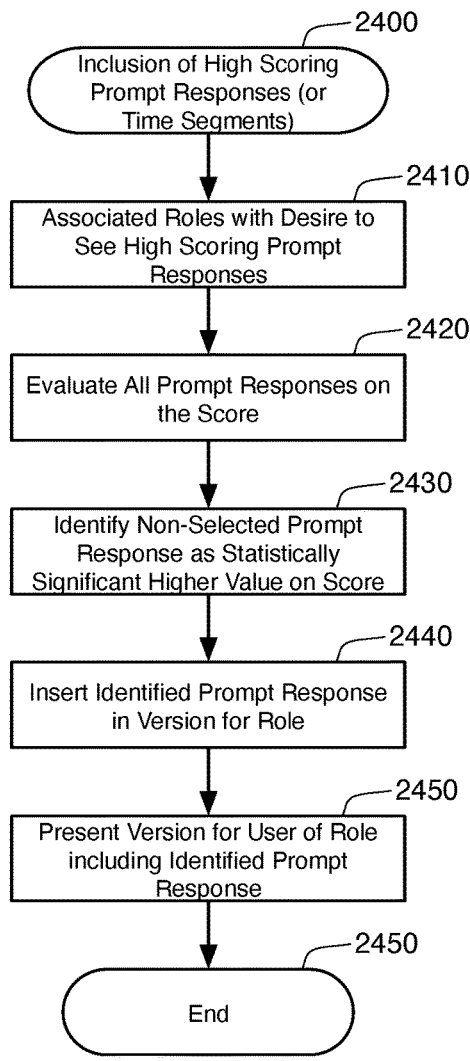
FIG. 24 is a flow chart showing a process of generating a customized presentation using the embodiment of FIGS. 22 and 23.

FIG. 24 shows a process 2400 for including high-scoring prompt segments 306 in a custom version 30. The method 2400 starts at step 2410 by associating the roles with a desire to see a high-scoring prompt segment. This can be accomplished by changing the frame 900, or by allowing individual users to specify such a desire in their own preference data. In the context of FIG. 22, Mark Rodriguez 2200 altered his preferences so as to include the highest empathy scoring segment. If multiple score values 360 are being assigned by the system 10, this step 2410 will include specifying the particular score or scores to which this desire applies.

At step 2420, all time segments 310 are assigned relevant score values 360. Alternatively, entire prompt segments 306 can be assigned to a score value, either independently or by averaging the score values 360 of their constituent time segments 310. At step 2430, time or prompt segments that have a statistically higher score 360 are identified. As explained above, the statistically higher score 360 can be determined by a minimum percentage that the segment must score higher than the highest segment already being included. In other embodiments, the scores 360 can be compared across all candidates, requiring a score that is in the top 5% of all candidates for a particular prompt 300. Those skilled in the art can easily identify other statistical or numerical techniques for identifying worthy prompt segments 306 for inclusion in step 2430.

At step 2440, the identified prompt segment (if any) is inserted into the ordered prompts 300, such as prompts 2250. At step 2450, the version 30 is created and submitted to the user computer system 160. If a prompt segment was selected at step 2430, the version 30 will include that high-scoring prompt segment. Note that this determination is made by analyzing the actual scores generated for the recorded session for that individual 20. Thus, the created version 30 for different individuals 20 will likely vary. The method ends at step 2450.

Overall Method

Figure 25:
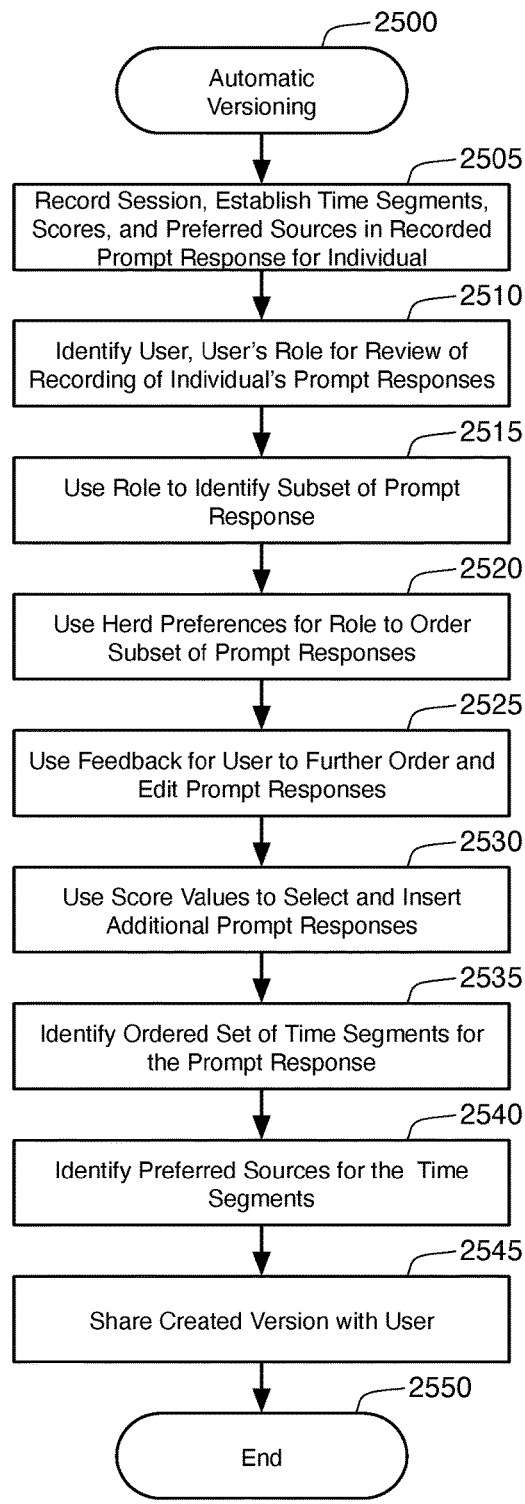
FIG. 25 is a flow chart showing a process of automatically generating versions for users.

FIG. 25 shows an overall method 2500 for creating custom versions or stories 30 for a recorded session of an individual 20. The first step 2505 involves recording the session of the individual 20 in the booth 100. Prompts 300 are provided to the individual 20, which are used to divide the recorded data into time segments 310. Additional time segments 310 can be identified within each prompt segment, such as by identifying switching events. Preferred sources from the plurality of cameras 110 and the plurality of microphones 120 are established for each time segment 310, establishing the video for that time segment. Scores 360 are also assigned to each time segment. This step 2505 is further described above in connection with process 500 and FIGS. 1-5.

At step 2510, a user of user computer system 160 is identified, such as by requiring a login to the system 10. Once a user record 700 is identified for the user, a role 710 and entity 720 can also be identified. At this point, the user will also identify an objective or job 610 for which they want to review individuals 20. At step 2515, a frame such as frame 900 (or other process) is used to identify a set of prompt segments 306 that are relevant to the identified role 710 of the user 700. This is accomplished by identifying the skills 620 relevant to a particular objective 610, and then identifying a subset of those skills 620 that are of interest to a particular role 710.

At step 2520, the herd analysis described in connection with FIGS. 11 and 12 are used to sort the prompt segments 306 for that role 710. In addition to this sorting, it is also possible at step 2525 to monitor the user to determine which prompts 300 have been most impactful in the user's use of system 10, as was explained in connection with FIGS. 16, 17, and 18. In addition to using steps 2520 and 2525 to sort the prompt segments 306, it is also possible to use these steps to subtract or redact portions of prompt segments 306 that are predicted to be of less interest to the user. The separate scores 360 assigned to time segments 310 can be used to identify relatively poor segments that can be removed from the resulting presentation. At step 2530, some embodiments will also examine the separate scores 360 to identify additional prompt segments 306 to add into a presentation 30. As explained in connection with FIGS. 22-24, a prompt segment that obtains a high score or scores 360 may be of particular interest to certain roles 710 and users 700, and therefore should be included even if not identified in any frame 900 for that role 710.

At step 2535, the ordered set of prompt segment are then converted into an ordered set of time segments 310. Some prompt segments 306 are associated with only a single time segment 310, while other prompt segments 306 will be divided into multiple time segments 310. Preference data associated with each time segment 310 (in step 2505) are then used to identify the preferred source of recorded data (the video data) for each time segment in step 2540. At this point, the preferred sources of data for the time segments 310 are utilized to create a version 30 of the recorded session of that individual 20, and this version 30 is then shared with the user computer system 160 at step 2545. The method ends at step 2550. Customization steps 2520, 2525, 2530, 2535 and 2540 could be performed in a different order than presented in FIG. 25. For example, step 2525, in which feedback is used to order and edit prompt responses, could be performed before step 2520, where herd preferences are used to modify an order of a subset of prompt responses step 2520. It is also possible to perform some but not all of the customization steps 2520, 2525, 2530, 2535 and 2540.

A large advantage of using this method 2550 to create customized versions 30 of recorded sessions is that the same method 2550 can be applied to the recorded session of a variety of individuals 20 and a variety of different users. In the context of a job interview, a hiring manager 1310 such as Mark Rodriguez 2200 would desire to see recorded sessions for multiple individuals 20. Since the method 2500 is applied to each individual 20, great efficiencies are gained. Using system 10, Mr. Rodriguez will automatically only see a portion of each individual's session, and the portion chosen (the identified prompt segments 306) will be consistent across individuals 20 according to Mr. Rodriguez' role 710 as a hiring manager 1310. He might see, for example, each individual's answers to questions on how the individual 20 deals with adversity, handles problems in the workplace, and responds to questions about relocation. In addition, he will see that portion of each individual's session that is thought to show the individual 20 at their most empathetic.

An example of how prompt segments 306 and time segments 310 can vary across multiple individuals is seen in FIG. 26. The recorded session 2600 for a first individual in this example is divided into prompt segments 306 according to the timing of the six prompts presented to this individual. Since, in FIG. 26, the vertical dimension represents time, it can be seen that the first individual spent a great deal of time answering prompt-3 1420, but much less time answering prompt-2 1410. A different recording session 2620 is shown for a second individual. The overall time of this recording session (the vertical length) is shorter for this second individual. Nonetheless, this second individual also responded to the same six prompts, and in fact spent much more time responding to prompt-2 1430 than the first individual. Each of the prompt segments 306 shown in FIG. 26 are divided into time segments 310 using the techniques described above, with some prompt segments 306 (such as prompt segment 5 2630 and prompt segment 6 2640) containing only a single time segment 310.

If Mr. Rodriguez is to view the video segments for prompt-2, prompt-3, prompt-1, and prompt-4, in that order, it is clear from FIG. 26 which time segments 310 would be presented to him for each individual. This is true even though the individual timing information and time segment data for each prompt segment 306 varies significantly. Thus, the selection of video segments would not be complicated the fact that the second individual spent significantly more time on prompt-2 1410 than the first individual, or by the fact that the second individual started responding to prompt-2 1410 earlier in the recording session, or by the fact that prompt segment 2 1410 for the second individual contains three time segments 310, while the same prompt segment 1410 for the first individual contains only one time segment 310. In each case, the identified prompt segments 306 would be associated with time segments, and the resulting video segments would be presented in the appropriate order. In this manner, the identification of prompt segments 306 for the recorded sessions 2600, 2620 allows for a consistent topical presentation 30 of less than the whole recorded sessions 2600, 2620 for Mr. Rodriguez regardless of the individual differences between recorded sessions 2600, 2620.

Another user, such as Abdul James 1900, might be associated with a co-worker role 1910 for the same job 1330 and the same set of individual candidates 20. Mr. James's version 30 of the recorded sessions 2600, 2620 for each individual 20, however, will be very different than that shown to Mr. Rodriguez. For instance, Mr. James might view prompt 1 1430, prompt-2 1410, and then prompt-4, 1440, in that order. The timing information for these prompt segments 306 will vary between the first individual and the second individual, but the actual prompt segments 306 selected will remain consistent in the customized presentations 30 for these two individual candidates 20.

FIG. 27 shows the recorded session 2700 of the same second individual from FIG. 26. While FIG. 26 shows a first recorded session for this individual 20 in which the individual responded to prompt-1 1430 through prompt-6 2640 in order, FIG. 27 shows a second recorded session for the same individual 20 where only two prompts were responded to. An individual 20 might re-record their responses to certain prompts if they are unsatisfied with their prior responses. In this case, the second individual returned to booth 100 and limited their second session to record a new answer to the fourth and second prompts, in that order (there is no need that the prompts 300 be provided to the individual 20 in a particular order). The newly recorded video can therefore be divided into prompt segment 4.1 2710 and prompt segment 2.1 2720.

When creating a customized presentation version 30 of this second individual 20, the system 10 can now pull prompt segments from either recorded session 2620 or recorded session 2700. As explained above, Mr. Rodriguez may receive a presentation 30 that includes video segments for prompt-2, prompt-3, prompt-1, and prompt-4. The video segments for prompt-3 and prompt-1 must come from recorded session 2620 as this is the only session that contains prompt segments 306 for those prompts. In contrast, the system 10 may choose between prompt segment 2 1410 from session 2620 and prompt segment 2.1 2720 from recorded session 2700, and may also choose between prompt segment 4 1440 from session 2620 and prompt segment 4.1 2710 from session 2700. In one embodiment, the system 10 merely selects the most recently recorded prompt segment 306 when multiple options are available. In other embodiments, however, the system 10 will use its automated scores 360 to determine a best overall prompt segment 306, namely the one having the highest scoring time segments 310.

As used in this specification and the appended claims, the singular forms include the plural unless the context clearly dictates otherwise. The term "or" is generally employed in the sense of "and/or" unless the content clearly dictates otherwise. The phrase "configured" describes a system, apparatus, or other structure that is constructed or configured to perform a particular task or adopt a particular configuration. The term "configured" can be used interchangeably with other similar terms such as arranged, constructed, manufactured, and the like.

All publications and patent applications referenced in this specification are herein incorporated by reference for all purposes.

While examples of the technology described herein are susceptible to various modifications and alternative forms, specifics thereof have been shown by way of example and drawings. It should be understood, however, that the scope herein is not limited to the particular examples described. On the contrary, the intention is to cover modifications, equivalents, and alternatives falling within the spirit and scope herein.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
   a) recording first-individual data including visual data and audio data of a first individual;
   b) while recording the first-individual data, defining first-individual prompt segments based on timing information for a set of prompts presented to the first individual;
   c) dividing the first-individual data into first-individual video segments that temporally correspond to the first-individual prompt segments;
   d) receiving a first request from a first user computer to view first-individual data, the first request including first-user information;
   e) identifying first-individual prompt segments for the first user by identifying the first-individual prompt segments associated with a first-user subset of prompts identified for the first-user information;
   f) sending to the first user computer a first customized presentation comprising the first-individual video segments corresponding to the first-individual prompt segments for the first user;
   g) recording second-individual data including visual data and audio data of a second individual and defining second-individual prompt segments based on timing information for the set of prompts presented to the second individual;
   h) dividing the second-individual data into second-individual video segments that temporally correspond to the second-individual prompt segments;
   i) receiving a second request from the first user computer to view second-individual data;
   j) identifying second-individual prompt segments for the first user by identifying the second-individual prompt segments associated with the first-user subset of prompts;
   k) sending to the first user computer a second customized presentation comprising the second-individual video segments corresponding to the second-individual prompt segments for the first user;
   l) receiving a third request from a second user computer to view the first-individual data, the request including second-user information;
   m) identifying first-individual prompt segments for the second user by identifying the first-individual prompt segments associated with a second-user subset of prompts identified for the second-user information, the second-user subset of prompts being different than the first-user subset of prompts;
   n) sending to the second user computer a third customized presentation comprising the first-individual video segments corresponding to the first-individual prompt segments for the second user.

2. The method of claim 1, wherein the visual data is received from a first camera and a second camera, further wherein each video segment includes audio data and preferred visual data received from one of the first and second cameras.

3. The method of claim 2, wherein each prompt segment is associated with preference data identifying the camera for the preferred visual data.

4. The method of claim 1, wherein at least one time segment is associated with each prompt segment; further wherein the video segments temporally correspond to the time segments.

5. The method of claim 4, wherein the video segments temporally correspond to the time segments on a 1-to-1 basis.

6. The method of claim 5, wherein a particular first-individual prompt segment is associated with a first time segment and a second time segment.

7. The method of claim 6, wherein the visual data recorded of the first individual is received from a first camera and a second camera, wherein preference data identifies a preferred video source for each time segment, further wherein the preference data identifies the first camera as the preferred video source for the first time segment and the second camera as the preferred video source for the second time segment, and still further wherein the first customized presentation switches between visual data received from the first camera and visual data received from the second camera during the two first-individual video segments corresponding to the particular first-individual prompt segment.

8. The method of claim 4, wherein a plurality of the time segments are scored, in part, based on behavioral sensor data.

9. The method of claim 1, further comprising recording a first user at the first user computer while viewing the first-individual video segments in order to determine an engagement score for each prompt segment, wherein a high-scoring prompt segment is associated with a high engagement score and a low-scoring prompt segment is associated with a low engagement score; wherein the second-individual video segments are sorted in the second customized presentation so that the high-scoring prompt segment appears before the low-scoring prompt segment as a result of the difference in engagement scores.

10. The method of claim 9, wherein the video segment for the low-scoring prompt segment is edited to remove video content as a result of the low engagement score.

11. The method of claim 1, wherein the subsets of prompts are identified for user information by first establishing a role for the user information and then identifying the prompts associated with the role, wherein the first-user subset of prompts are associated with a first role and the second-user subset of prompts are associated with a second role.

12. The method of claim 11, wherein the first-individual video segments for the first customized presentation are sorted according to an analysis of prior users associated with the first role before they are sent to the first user computer.

13. The method of claim 12, wherein the analysis of prior users comprises analyzing preferred viewing orders when the prior users are permitted access to the video segments and allowed to select which video segments are viewed and in which order.

14. The method of claim 11, wherein the customized presentations relate to an objective database entity associated with a plurality of criteria defined in criteria database entities, wherein the objective and criteria database entities are stored in a data store.

15. The method of claim 14, wherein the customized presentations are based upon the plurality of criteria associated with the objective database entities, wherein a first set of criteria are identified with the first role, a second set of criteria are identified with the second role.

16. The method of claim 15, wherein each criteria is associated in the data store with at least one provided prompt, further wherein the subsets of prompts are identified for the user information by identifying the role for the user information, identifying the criteria for the identified role, and then identifying the prompts for the identified criteria.

17. The method of claim 16, wherein the criteria are associated in the data store to prompts on a many-to-many basis.

18. The method of claim 16, wherein the criteria are associated with skills required for a job, further wherein the first individual and the second individual are applicants for the job.

19. A method comprising:
a) recording video data of an individual using a first camera and a second camera;
b) while recording the video data, defining prompt segments based on timing information for a set of prompts presented to the individual;
c) dividing the prompt segments into time segments based on an analysis of the video data, wherein a first prompt segment is divided into a first time segment and a second time segment;
d) dividing the video data into video segments that temporally correspond to the time segments, wherein the first time segment comprises video from the first camera and the second time segment comprises video from the second camera;
e) receiving a first request to view the video data from a first user;
f) identifying a subset of prompts for the first user;
g) identifying a plurality of time segments associated with the subset of prompts including the first and second time segments; and
h) transmitting to the first user a customized presentation comprising the video segments corresponding to the plurality of time segments.

20. The method of claim 19, further comprising scoring video segments based in part on analysis of a behavioral sensor, further wherein a subset of the video segments corresponding to the plurality of time segments are removed from the customized presentation based on the scoring.

* * * * *